US012810383B2

(12) United States Patent
Tedla et al.

(10) Patent No.: US 12,810,383 B2
(45) Date of Patent: Nov. 24, 2026

(54) EXAMINING JOINT DEMOSAICING AND DENOISING FOR SINGLE-BAYER, QUAD-BAYER, AND NONA-BAYER PATTERNS

(71) Applicant: SAMSUNG ELECTRONICS CO., LTD., Suwon-si (KR)

(72) Inventors: Saikiran Kumar Tedla, North York (CA); Abhijith Punnappurath, North York (CA); Luxi Zhao, Toronto (CA); Michael Scott Brown, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 18/823,268

(22) Filed: Sep. 3, 2024

(65) Prior Publication Data

US 2025/0166123 A1 May 22, 2025

Related U.S. Application Data

(60) Provisional application No. 63/600,137, filed on Nov. 17, 2023.

(51) Int. Cl.
*G06K 9/00* (2022.01)
*G06T 3/4015* (2024.01)
(Continued)

(52) U.S. Cl.
CPC .............. *G06T 3/4015* (2013.01); *G06T 5/70* (2024.01)

(58) Field of Classification Search
USPC ....... 382/100, 103, 106, 154, 156, 167, 168, 382/173, 181, 199, 254, 305, 312;
(Continued)

(56) References Cited

U.S. PATENT DOCUMENTS

2020/0410636 A1* 12/2020 Kim .......................... G06N 3/04
2022/0130012 A1* 4/2022 Park ......................... G06T 11/10
(Continued)

FOREIGN PATENT DOCUMENTS

CN 110719447 A 1/2020
KR 10-2784816 B1 3/2025
(Continued)

OTHER PUBLICATIONS

International Search Report and Written Opinion issued Jan. 3, 2025 by the International Searching Authority in International Patent Application No. PCT/KR2024/015280 (PCT/ISA/220, PCT/ISA/210 and PCT/ISA/237).

*Primary Examiner* — Seyed H Azarian
(74) *Attorney, Agent, or Firm* — Sughrue Mion, PLLC

(57) ABSTRACT

The present disclosure provides methods, apparatuses, systems, and computer-readable mediums for demosaicing images by an apparatus. A method includes obtaining, from a plurality of sensors of the apparatus, a plurality of mosaic images, concatenating each image of the plurality of mosaic images with encoded embeddings of the corresponding mosaic pattern of the sensor of the plurality of sensors that captured that image of the plurality of mosaic images, providing the concatenated plurality of mosaic images to a machine learning model, and acquiring, from the machine learning model, a plurality of demosaiced images corresponding to the plurality of mosaic images. Each sensor of the plurality of sensors has a corresponding mosaic pattern from among a plurality of mosaic patterns.

18 Claims, 17 Drawing Sheets

(51) Int. Cl.
*G06T 5/70* (2024.01)
*G06T 11/10* (2026.01)

(58) Field of Classification Search
USPC ............................................ 348/222.1, 223.1
See application file for complete search history.

(56) References Cited

U.S. PATENT DOCUMENTS

| | | | | |
|---|---|---|---|---|
| 2022/0182537 | A1* | 6/2022 | Kim | G06N 3/045 |
| 2022/0182590 | A1* | 6/2022 | Cho | G06N 3/045 |
| 2022/0309712 | A1* | 9/2022 | Lee | G06T 1/20 |
| 2022/0384499 | A1 | 12/2022 | Jeon et al. | |
| 2023/0127009 | A1 | 4/2023 | Gilmutdinov et al. | |
| 2023/0232122 | A1* | 7/2023 | Swami | G06T 3/4015<br>348/222.1 |
| 2025/0124080 | A1* | 4/2025 | Kim | H04N 21/4312 |

FOREIGN PATENT DOCUMENTS

| | | | |
|---|---|---|---|
| KR | 10-2797187 | B1 | 4/2025 |
| WO | 2023/275032 | A1 | 1/2023 |

* cited by examiner

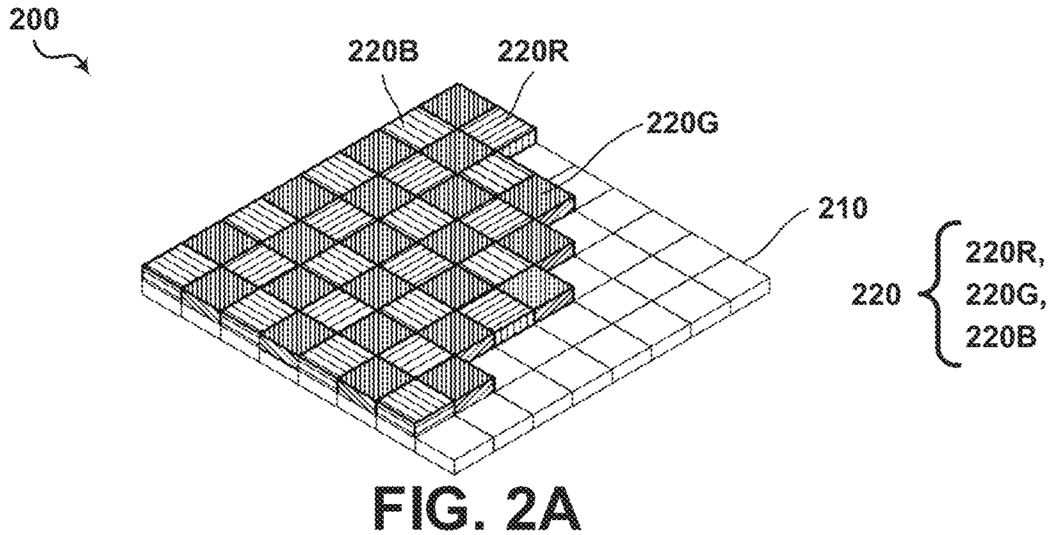
FIG. 2A
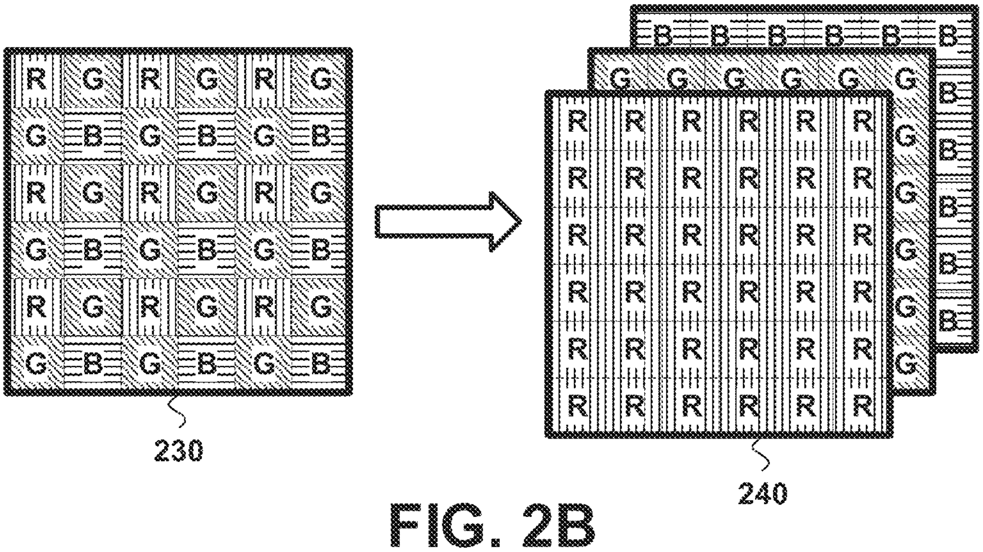
FIG. 2B
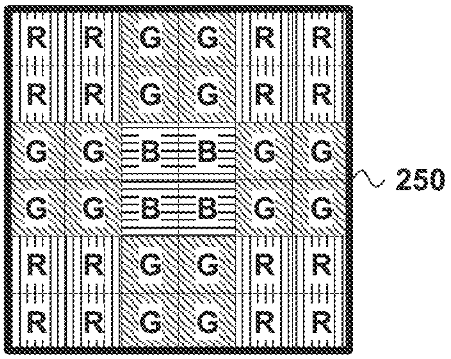
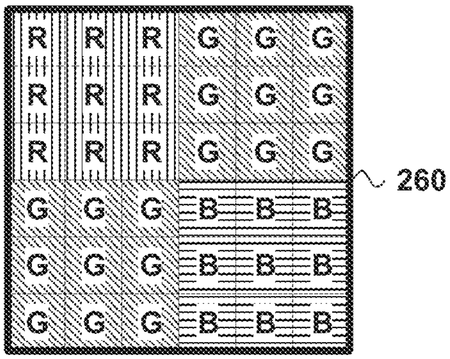
FIG. 2C
FIG. 2D

NOT ALL SHUFFLING OPERATIONS ARE VISUALIZED

EXAMINING JOINT DEMOSAICING AND DENOISING FOR SINGLE-BAYER, QUAD-BAYER, AND NONA-BAYER PATTERNS

CROSS-REFERENCE TO RELATED APPLICATIONS

This application claims benefit of priority under 35 U.S.C. § 119 to U.S. Provisional Patent Application No. 63/600,137, filed on Nov. 17, 2023, in the U.S. Patent and Trademark Office, the disclosure of which is incorporated by reference herein in its entirety.

BACKGROUND

1. Field

The present disclosure relates generally to image processing, and more particularly to methods, apparatuses, systems, and non-transitory computer-readable mediums for joint demosaicing and denoising of mosaic images captured using multiple sensor mosaic layouts.

2. Description of Related Art

Recent improvements in both camera hardware and image processing software may have turned modern mobile devices (e.g., smartphones, cellular phones, tablet computers, digital cameras, personal digital assistants (PDA), wearable devices, or the like) into powerful yet portable image and/or video capturing and/or recording devices. As a result, mobile devices may contain multiple imaging sensors (e.g., still cameras, motion cameras, video cameras, or the like). In addition, each of the imaging sensors installed on the mobile devices may be manufactured with different hardware configurations depending on design constraints and/or a desired functionality. For example, the plurality of imaging sensors of a mobile device may have color filter arrays (CFAs) positioned in front of the imaging sensors with each pixel of the imaging sensor being placed behind an individual color filter. In such an example, the color filters of the CFA may be arranged in different mosaic (e.g., repeating) layout patterns.

In order to obtain full color images (e.g., red-green-blue (RGB) images) from the imaging sensors, the mobile devices may need to demosaic the mosaic images (e.g., RAW image data) outputted by the imaging sensors. Demosaicing may refer to an image processing step that may estimate a full color image (e.g., RGB image) based on the imaging sensor's color filter mosaic layout (e.g., Bayer pattern, Fujifilm™ X-Trans pattern, or the like). That is, the mosaic images provided by the imaging sensor may not include values for all colors (e.g., red, green, and blue) for every pixel of the imaging sensor. Thus, the mobile device may need to estimate the missing color information based on the imaging sensor's CFA mosaic layout. For example, related mobile devices may employ a simple algorithm for estimating (e.g., interpolating) the missing color values based on the color values of neighboring pixels. As another example, related mobile devices may employ a machine learning model to generate the full color image from the mosaic images.

However, such approaches may be specific to a particular mosaic pattern, and thus, may require multiple algorithms and/or multiple models to support more than one mosaic pattern. Consequently, these approaches may not be easily scalable and may not be able to support multiple imaging sensors having different mosaic patterns as the resource overhead (e.g., memory footprint, processing load, or the like) incurred by having custom algorithms and/or models for each mosaic pattern, as well as, a time and/or processing overhead for switching between the different algorithms and/or models, may be prohibitive.

Thus, there exists a need for further improvements to image processing technologies, as the need to perform demosaicing and/or denoising of mosaic images captured using multiple mosaic layouts may be constrained by resource, time, and/or processing overheads. Improvements are presented herein. These improvements may also be applicable to other image processing technologies and the image processing standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, systems, and non-transitory computer-readable mediums for joint demosaicing and denoising of mosaic images captured with multiple sensor mosaic layouts are disclosed by the present disclosure.

According to an aspect of the present disclosure, a method for demosaicing images by an apparatus includes obtaining, from a plurality of sensors of the apparatus, a plurality of mosaic images, concatenating each image of the plurality of mosaic images with encoded embeddings of the corresponding mosaic pattern of the sensor of the plurality of sensors that captured that image of the plurality of mosaic images, providing the concatenated plurality of mosaic images to a machine learning model, and acquiring, from the machine learning model, a plurality of demosaiced images corresponding to the plurality of mosaic images. Each sensor of the plurality of sensors has a corresponding mosaic pattern from among a plurality of mosaic patterns.

In some embodiments, the plurality of mosaic patterns may include at least one of a Single-Bayer pattern, a Quad-Bayer pattern, a Nona-Bayer pattern, or a Q×Q Bayer pattern, and Q is a positive integer greater than three (3).

In some embodiments, each of the encoded embeddings may indicate the corresponding mosaic pattern of a color filter array of a corresponding sensor of the plurality of sensors.

In some embodiments, each of the encoded embeddings may include positional information of one or more colors of the corresponding mosaic pattern.

In some embodiments, each of the encoded embeddings may include one or more one-hot encoding patterns corresponding to a sensor pattern of a corresponding sensor of the plurality of sensors.

In some embodiments, each of the one or more one-hot encoding patterns may correspond to a color of the sensor pattern of the corresponding sensor.

In some embodiments, at least one sensor of the plurality of sensors may include one or more dead pixels in a color filter array of the at least one sensor, the encoded embeddings corresponding to the at least one sensor may indicate the one or more dead pixels, and the acquiring of the plurality of demosaiced images may include acquiring, from the machine learning model, one or more demosaiced images corresponding to the at least one sensor having the one or more dead pixels corrected.

In some embodiments, the plurality of mosaic images may include one or more mosaic images with noise, and the acquiring of the plurality of demosaiced images may include acquiring, from the machine learning model, one or more demosaiced images corresponding to the one or more mosaic images having the noise removed.

In some embodiments, the method may further include training the machine learning model based on a first portion of an image dataset and the encoded embeddings of the plurality of mosaic patterns, validating the machine learning model using a second portion of the image dataset and the encoded embeddings of the plurality of mosaic patterns, and testing the machine learning model using a third portion of the image dataset and the encoded embeddings of the plurality of mosaic patterns. The image dataset may include a plurality of scenes captured at a plurality of views. Each view of the plurality of views may be captured at a plurality of focuses. Each scene may include at least one high-frequency region that may include at least one of a plurality of textures or a plurality of objects having a size less than a predetermined threshold. The second portion may be different from the first portion, and the third portion may be different from the first portion and the second portion.

In some embodiments, the training of the machine learning model may include determining a random amount of pixels to mask out in the encoded embeddings for each training iteration of the machine learning model, and randomly selecting the random amount of pixels of the encoded embeddings to be masked out.

In some embodiments, the determining of the random amount of pixels may include determining a random percentage value between zero and a predetermined mask limit, and calculating the random amount of pixels to mask out based on the random percentage value.

According to an aspect of the present disclosure, an apparatus for demosaicing images includes a plurality of sensors, a memory storing instructions, and one or more processors communicatively coupled with the plurality of sensors and the memory. Each sensor of the plurality of sensors has a corresponding mosaic pattern from among a plurality of mosaic patterns. The one or more processors are configured to execute the instructions to obtain, from the plurality of sensors, a plurality of mosaic images, concatenate each image of the plurality of mosaic images with encoded embeddings of the corresponding mosaic pattern of the sensor of the plurality of sensors that captured that image of the plurality of mosaic images, provide the concatenated plurality of mosaic images to a machine learning model, and acquire, from the machine learning model, a plurality of demosaiced images corresponding to the plurality of mosaic images.

In some embodiments, the plurality of mosaic patterns may include at least one of a Single-Bayer pattern, a Quad-Bayer pattern, a Nona-Bayer pattern, or a Q×Q Bayer pattern, and Q may be a positive integer greater than three (3).

In some embodiments, each of the encoded embeddings may indicate the corresponding mosaic pattern of a color filter array of a corresponding sensor of the plurality of sensors.

In some embodiments, each of the encoded embeddings may include positional information of one or more colors of the corresponding mosaic pattern.

In some embodiments, at least one sensor of the plurality of sensors may include one or more dead pixels in a color filter array of the at least one sensor, the encoded embeddings corresponding to the at least one sensor may indicate the one or more dead pixels, and the one or more processors may be further configured to execute the instructions to acquire, from the machine learning model, one or more demosaiced images corresponding to the at least one sensor having the one or more dead pixels corrected.

In some embodiments, the plurality of mosaic images may include one or more mosaic images with noise, and the one or more processors may be further configured to execute the instructions to acquire, from the machine learning model, one or more demosaiced images corresponding to the one or more mosaic images having the noise removed.

In some embodiments, the one or more processors may be further configured to execute the instructions to train the machine learning model based on a first portion of an image dataset and the encoded embeddings of the plurality of mosaic patterns, validate the machine learning model using a second portion of the image dataset and the encoded embeddings of the plurality of mosaic patterns, the second portion being different from the first portion, and test the machine learning model using a third portion of the image dataset and the encoded embeddings of the plurality of mosaic patterns, the third portion being different from the first portion and the second portion. The image dataset may include a plurality of scenes captured at a plurality of views. Each view of the plurality of views may be captured at a plurality of focuses. Each scene may include at least one high-frequency region that may include at least one of a plurality of textures or a plurality of objects having a size less than a predetermined threshold.

In some embodiments, the one or more processors may be further configured to execute the instructions to determine a random percentage value between zero and a predetermined mask limit, calculate, based on the random percentage value, a random amount of pixels to mask out in the encoded embeddings for each training iteration of the machine learning model, and randomly select the random amount of pixels of the encoded embeddings to be masked out.

According to an aspect of the present disclosure, an apparatus for demosaicing images includes means for obtaining, from a plurality of sensors of the apparatus, a plurality of mosaic images, means for concatenating each image of the plurality of mosaic images with encoded embeddings of the corresponding mosaic pattern of the sensor of the plurality of sensors that captured that image of the plurality of mosaic images, means for providing the concatenated plurality of mosaic images to a machine learning model, and means for acquiring, from the machine learning model, a plurality of demosaiced images corresponding to the plurality of mosaic images. Each sensor of the plurality of sensors has a corresponding mosaic pattern from among a plurality of mosaic patterns.

According to an aspect of the present disclosure, a non-transitory computer-readable storage medium storing computer-executable instructions for demosaicing images by an apparatus is provided. The computer-executable instructions, when executed by at least one processor of the apparatus, cause the apparatus to obtain, from a plurality of sensors of the apparatus, a plurality of mosaic images, concatenate each image of the plurality of mosaic images with encoded embeddings of the corresponding mosaic pattern of the sensor of the plurality of sensors that captured that image of the plurality of mosaic images, provide the concatenated plurality of mosaic images to a machine learning model, and acquire, from the machine learning model, a plurality of demosaiced images corresponding to the plurality of mosaic images. Each sensor of the plurality of sensors has a corresponding mosaic pattern from among a plurality of mosaic patterns.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2A depicts an example of a color filter array (CFA), in accordance with various aspects of the present disclosure;

FIG. 2B illustrates an exemplary demosaicing process, in accordance with various aspects of the present disclosure;

FIG. 2C depicts an example of a Quad-Bayer pattern of a CFA, in accordance with various aspects of the present disclosure;

FIG. 2D illustrates an example of a Nona-Bayer pattern of a CFA, in accordance with various aspects of the present disclosure;

DETAILED DESCRIPTION

Figure 1:
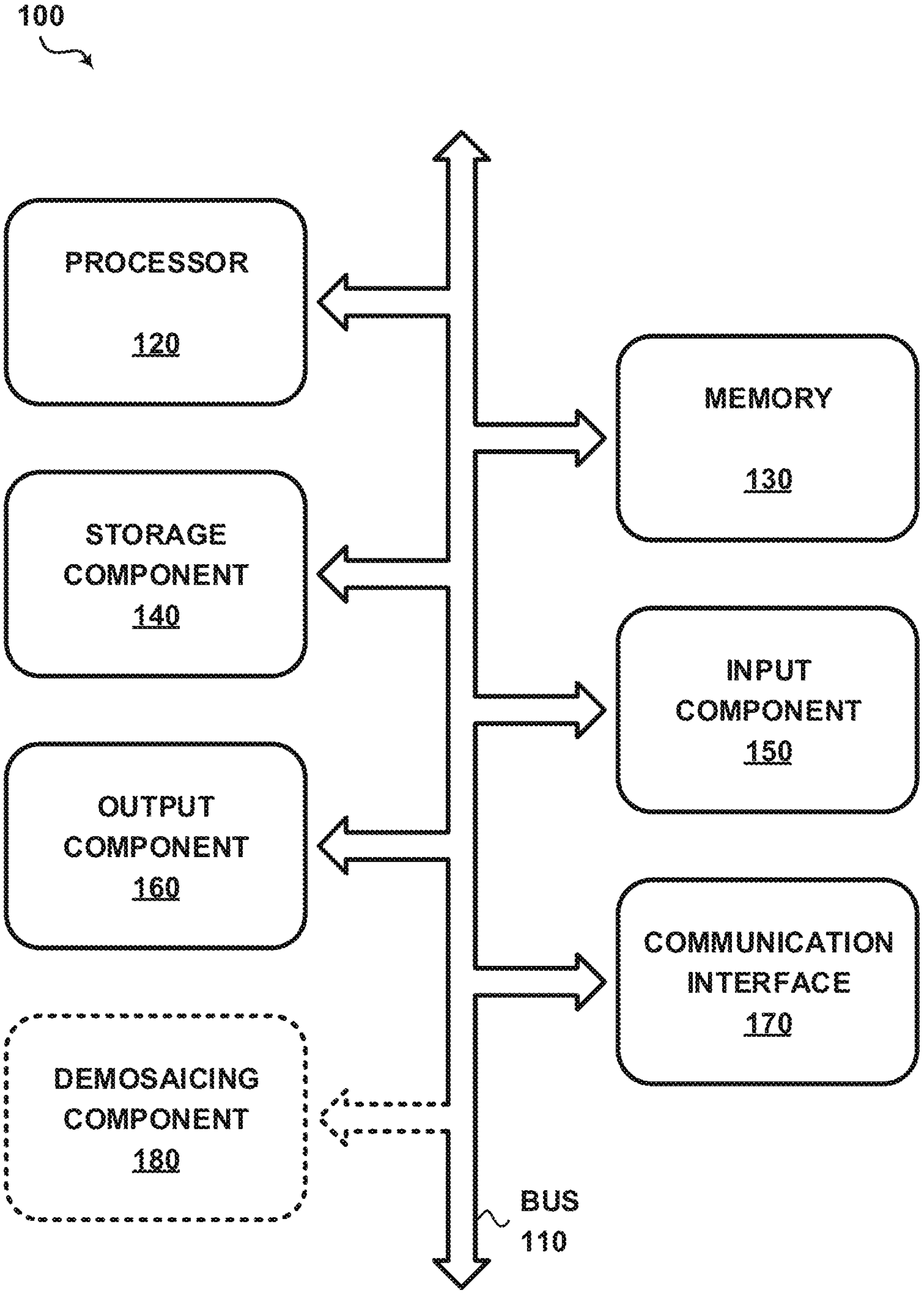
FIG. 1 illustrates an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the present disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, or the like. It is to be understood and appreciated that the various systems may include additional devices, components, modules, or the like and/or may not include all of the devices, components, modules, or the like discussed in connection with the figures. A combination of these approaches may also be used.

As a general introduction to the subject matter described in more detail below, aspects described herein are directed towards apparatuses, methods, systems, and non-transitory computer-readable mediums for performing joint demosaicing and denoising of mosaic images captured using multiple sensor mosaic layouts. Further, aspects described herein may provide for correcting the images for dead pixels in the imaging sensors.

Aspects presented herein may provide for a machine learning model that may be jointly trained with an image dataset of mosaic images (e.g., RAW and/or unprocessed image data) captured with multiple sensor mosaic layouts. The mosaic images may be concatenated with encoded embedding information indicating the sensor mosaic layout of the mosaic images. The machine learning model may be configured to provide demosaiced and/or denoised images corresponding to the inputted mosaic images and the corresponding sensor mosaic layout.

Advantageously, by using a unified machine learning model for demosaicing and denoising the mosaic images from multiple sensor mosaic layouts, a memory resource footprint of the unified machine learning model may be significantly reduced when compared to a memory resource footprint needed for having individual machine learning models for each sensor mosaic layout configuration. Furthermore, the unified machine learning model may be trained to correct for dead pixels in the sensor mosaic layouts, and thus provide, an improved demosaiced and/or denoised image when compared to related demosaicing approaches.

Although the present disclosure describes a machine learning model trained and/or configured to perform demosaicing, denoising, and/or dead pixel correction using mosaic images based on a red-green-blue (RGB) color space, the present disclosure is not limited in this regard. For example, the concepts described herein may be applied to other color spaces, such as, but not limited to, standard RGB (sRGB), luma-chroma (YCbCr), hue saturation value (HSV), International Commission on Illumination (CIE) 1931 RGB, CIE 1931 XYZ, or the like. As another example, the concepts described herein may be applied to electronic devices that have imaging sensors with more than three (3) different sensor mosaic layouts (e.g., four (4) or more mosaic layouts) without departing from the scope of the present disclosure. As yet another example, the concepts described herein may be applied to imaging sensors having mosaic layouts such as, but not limited to, 1×1 Single-Bayer patterns, 2×2 Quad-Bayer patterns, 3×3 Nona-Bayer patterns, Q×Q Bayer patterns, Fujifilm™ X-Trans patterns, or the like.

Notably, the aspects presented herein may be applied to perform demosaicing, denoising, and/or dead pixel correction on mosaic images that have been captured with multiple sensor mosaic layouts without the need to use different custom approaches for each sensor mosaic layout configuration.

As noted above, certain embodiments are discussed herein that relate to demosaicing images. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a processor, a personal computer (PC), a printed circuit board (PCB) including a computing device, a minicomputer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Alternatively or additionally, the device 100 may represent, be incorporated into, and/or include a desktop computer, a computer server, a virtual machine, a network appliance, a mobile device (e.g., a user equipment (UE), a laptop computer, a tablet computer, a personal digital assistant (PDA), a smart phone, any other type of mobile computing device, or the like), a camera, a wearable device (e.g., smart watch, headset, headphones, or the like), a smart device (e.g., a voice-controlled virtual assistant, a set-top box (STB), a refrigerator, an air conditioner, a microwave, a television (TV), or the like), an Internet-of-Things (IoT) device, and/or any other type of data processing device.

For example, the device 100 may include a processor, a personal computer (PC), a printed circuit board (PCB) including a computing device, a mini-computer, a mainframe computer, a microcomputer, a telephonic computing device (e.g., a cellular phone, a smart phone, a session initiation protocol (SIP) phone, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a demosaicing component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two (2) or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, and the demosaicing component 180).

The device 100 may further include the memory 130. In some embodiments, the memory 130 may include volatile memory such as, but not limited to, random access memory (RAM), static RAM (SRAM), dynamic RAM (DRAM), or the like. In optional or additional embodiments, the memory 130 may include non-volatile memory such as, but not limited to, read only memory (ROM), electrically erasable programmable ROM (EEPROM), NAND flash memory, phase-change RAM (PRAM), magnetic RAM (MRAM), resistive RAM (RRAM), ferroelectric RAM (FRAM), magnetic memory, optical memory, or the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, or the like). Alternatively or additionally, the input component 150 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, or the like). In an embodiment, the input component 150 may include more than one of a same sensor type (e.g., multiple cameras). In addition, the multiple sensors of the same type may have multiple configurations that may be different from each other. For example, the input component 150 may include a plurality of imaging sensors (e.g., cameras) that may have multiple color filter array mosaic layouts (e.g., Bayer patterns, Fujifilm™ X-Trans patterns, or the like) that may be different from each other.

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, or the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, or the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, or the like. In optional or additional embodiments, the communication interface 170 may include an Ethernet interface, an optical interface, a coaxial interface, an infrared interface, a radio frequency (RF) interface, a USB interface, an IEEE 1094 (FireWire) interface, or the like.

In some embodiments, the device 100 may include the demosaicing component 180, which may be configured to demosaic images. For example, the demosaicing component 180 may be configured to obtain a plurality of mosaic images, concatenate the plurality of mosaic images with encoded embeddings, provide the concatenated plurality of mosaic images to a machine learning model, and acquire a plurality of demosaiced images corresponding to the plurality of mosaic images.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two (2) or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to demosaicing images.

FIG. 2A depicts an example of a color filter array (CFA), in accordance with various aspects of the present disclosure. FIG. 2B illustrates an exemplary demosaicing process, in accordance with various aspects of the present disclosure. FIG. 2C depicts an example of a Quad-Bayer pattern of a CFA, in accordance with various aspects of the present disclosure. FIG. 2D illustrates an example of a Nona-Bayer pattern of a CFA, in accordance with various aspects of the present disclosure.

Referring to FIG. 2A, a CFA may be and/or may include a mosaic of color filters 220 (e.g., red filters 220R, green filters 220G, and blue filters 220B) that may be positioned in front of an imaging sensor 210 of an electronic device (e.g., device 100). That is, each pixel of the imaging sensor 210 may be placed behind an individual color filter 220 such that incident light reaching each pixel may pass through the color filter 220. In an embodiment, the mosaic of color filters 220 may be configured in a repeating pattern of alternating colors. The mosaic layout of the CFA may be referred to as a Bayer pattern. For example, as shown in FIG. 2A, a CFA may be configured in a mosaic layout that may be referred to as a 1×1 Single-Bayer pattern, and/or as a Bayer pattern. As shown in FIG. 2A, the Single-Bayer pattern may consist of alternating red filters 220R and green filters 220G for odd rows of the imaging sensor 210 and alternating green filters 220G and blue filters 220B for even rows of the imaging sensor 210. Thus, the Single-Bayer pattern may also be referred to as a RGGB pattern.

In an embodiment, each pixel of the imaging sensor 210 may be located behind a corresponding color filter 220, and consequently, each pixel may output a value (or level) corresponding to a RAW intensity (e.g., light intensity, brightness, photon count, or the like) of the corresponding filter color (e.g., red, green, or blue). That is, the imaging sensor 210 may output a single color value for each pixel of the imaging sensor 210. However, the device 100 may need all color values (e.g., red, green, and blue) for each pixel of the image outputted by the imaging sensor 210. Thus, the device 100 may need to estimate and/or generate color values in order to obtain full color images (e.g., red-green-blue (RGB) images) from the imaging sensor 210. Such a process may be referred to as demosaicing.

Referring to FIG. 2B, a demosaicing process of a Single-Bayer pattern image 230 is illustrated. As shown in FIG. 2B, a full three-channel (RGB) image 240 may be obtained by demosaicing the Single-Bayer pattern image 230. Demosaicing may refer to an image processing step that may estimate a full color image (e.g., RGB image 240) from the color filter mosaic pattern (e.g., Bayer pattern) outputted by the imaging sensor 210.

In an embodiment, imaging sensors 210 may include CFAs with a Single-Bayer pattern. However, recent improvements in both imaging sensor hardware and image processing software may have allowed for the introduction of other CFA mosaic patterns. For example, as shown in FIG. 2C, the imaging sensor 210 may use a 2×2 Quad-Bayer pattern 250. As another example, as shown in FIG. 2D, the imaging sensor 210 may use a 3×3 Nona-Bayer pattern 260. However, the present disclosure is not limited in this regard, and other CFA mosaic patterns may be used by the imaging sensor 210 without departing from the scope of the present disclosure. For example, the imaging sensor 210 may use a CFA with a Q×Q Bayer pattern, where Q is a positive integer greater than three (3). As another example, the imaging sensor 210 may use a CFA with a Fujifilm™ X-Trans pattern, or the like.

In an embodiment, an electronic device (e.g., device 100, a computing device, a smartphone, a PDA, a laptop, a tablet, a smart device, a wearable device, a smart device, an IoT device, or any other similar functioning device) may include multiple imaging sensors (e.g., cameras) as discussed with reference to FIGS. 3 and 4. Alternatively or additionally, the imaging sensors may have CFAs with multiple mosaic patterns (e.g., Bayer patterns).

Figure 3:
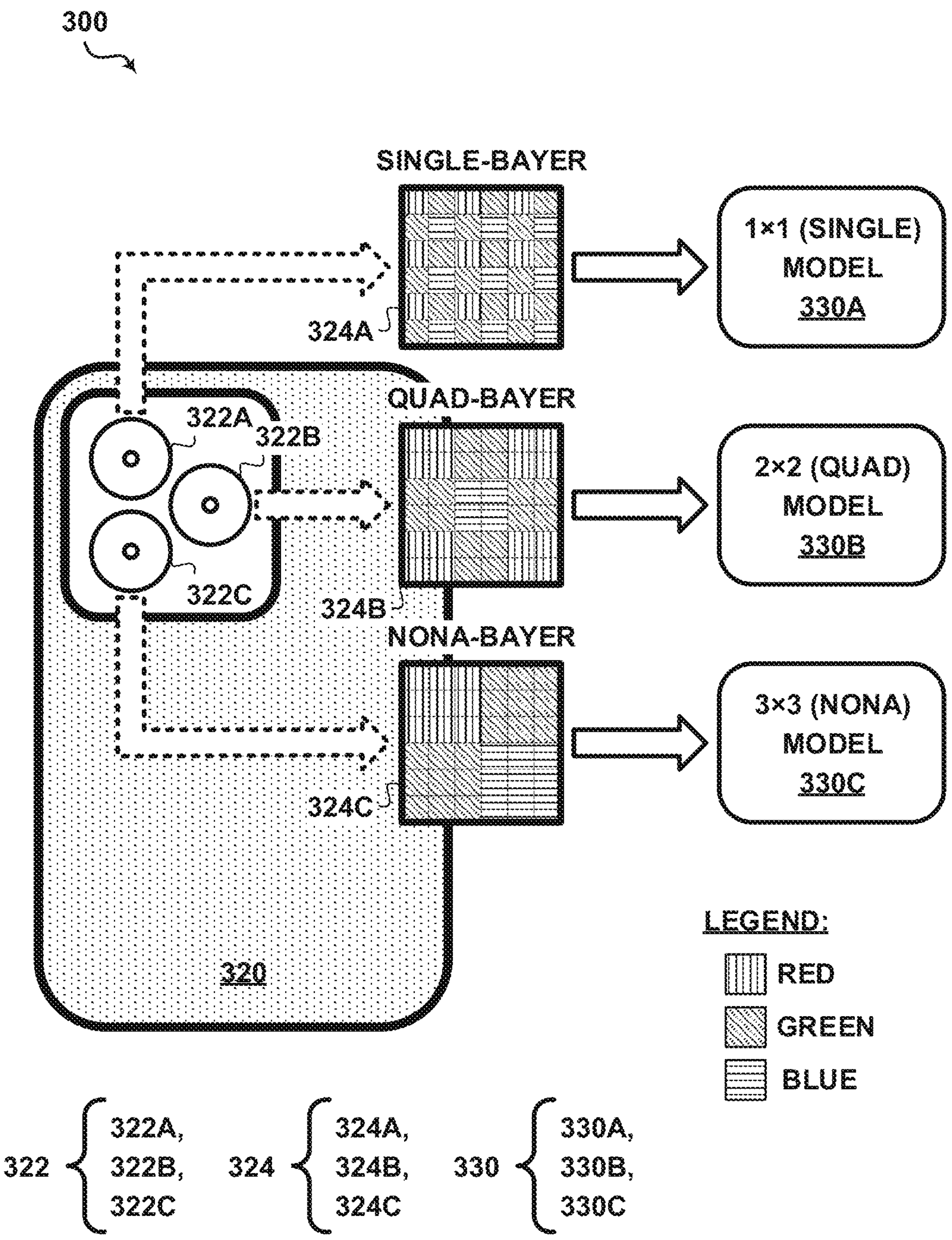
FIG. 3 depicts an example of a mobile device with multiple cameras, in accordance with various aspects of the present disclosure.

FIG. 3 depicts an example of a mobile device with multiple cameras, in accordance with various aspects of the present disclosure. Referring to FIG. 3, a mobile device 320 is illustrated. The mobile device 320 may include and/or may be similar in many respects to the device 100 described above with reference to FIG. 1, and may include additional features not mentioned above. For example, the mobile device 320 may include a processor 120, a memory 130, a storage component 140, an input component 150, an output component 160, a communication interface 170, as described with reference to FIG. 1. Consequently, repeated descriptions of the mobile device 320 described above with reference to FIG. 1 may be omitted for the sake of brevity.

As shown in FIG. 3, the mobile device 320 may include a plurality of imaging sensors 322 (e.g., a first imaging sensor 322A, a second imaging sensor 322B, and a third imaging sensor 322C). However, the present disclosure is not limited in this regard. For example, the mobile device 320 may include more than three (3) imaging sensors (e.g., four (4) or more imaging sensors) or may include less than three (3) imaging sensors (e.g., one (1) or two (2) imaging sensors).

Each imaging sensor 322 of the mobile device 320 may include a CFA having a corresponding mosaic pattern 324 (e.g., a first mosaic pattern 324A, a second mosaic pattern 324B, and a third mosaic pattern 324C). For example, the first imaging sensor 322A may have a first mosaic pattern 324A, the second imaging sensor 322B may have a second mosaic pattern 324B, and the third imaging sensor 322C may have a third mosaic pattern 324C. In an embodiment, the first mosaic pattern 324A may be a 1×1 Single-Bayer pattern, the second mosaic pattern 324B may be a 2×2 Quad-Bayer pattern, and the third mosaic pattern 324C may be a 3×3 Nona-Bayer pattern. However, the present disclosure is not limited in this regard. For example, the first mosaic pattern 324A may be the 2×2 Quad-Bayer pattern, the second mosaic pattern 324B may be the 3×3 Nona-Bayer pattern, and the third mosaic pattern 324C may be the 1×1 Single-Bayer pattern. As another example, one or more of the plurality of imaging sensors 322 may have the same mosaic pattern 324. In such an example, both the first mosaic pattern 324A and the second mosaic pattern 324B may be the 1×1 Single-Bayer pattern. As yet another example, one or more of the mosaic patterns 324 may be different from the mosaic patterns described above. In such an example, one or more of the mosaic patterns 324 may be a Q×Q Bayer pattern or another mosaic pattern configuration.

In an embodiment, the mobile device 320 may be configured to demosaic the mosaic images outputted by the plurality of imaging sensors 322 with a corresponding demosaicing model 330 (e.g., a 1×1 Single-Bayer demosaicing model 330A, a 2×2 Quad-Bayer demosaicing model 330B, or a 3×3 Nona-Bayer demosaicing model 330C). For example, as shown in FIG. 3, the mobile device 320 may demosaic the mosaic images outputted by the first imaging sensor 322A with the 1×1 Single-Bayer demosaicing model 330A, the mosaic images outputted by the second imaging sensor 322B may be demosaiced with the 2×2 Quad-Bayer demosaicing model 330B, and the mosaic images outputted by the third imaging sensor 322C may be demosaiced with the 3×3 Nona-Bayer demosaicing model 330C.

In an embodiment, the demosaicing models 330 may be and/or may include conventional demosaicing algorithms for performing the demosaicing of the mosaic images and directly output the demosaiced full images (e.g., RGB image 240). In an optional or additional embodiment, the demosaicing models 330 may be and/or may include machine learning models configured to provide demosaiced full images (e.g., RGB image 240) directly from the mosaic images outputted by the plurality of imaging sensors 322. For example, in such embodiments, the 1×1 Single-Bayer demosaicing model 330A may output demosaiced full images directly from mosaic images that may have been captured by the first imaging sensor 322A using the first mosaic pattern 324A (e.g., the 1×1 Single-Bayer pattern). The 2×2 Quad-Bayer demosaicing model 330B may output demosaiced full images directly from mosaic images that may have been captured by the second imaging sensor 322B using the second mosaic pattern 324B (e.g., the 2×2 Quad-Bayer pattern). The 3×3 Nona-Bayer demosaicing model 330C may output demosaiced full images directly from mosaic images that may have been captured by the third imaging sensor 322C using the third mosaic pattern 324C (e.g., the 3×3 Nona-Bayer pattern).

In an embodiment, the mobile device 320 may be configured to demosaic the mosaic images outputted by the plurality of imaging sensors 322 by converting the mosaic images to a particular Bayer pattern and demosaicing the converted image data using a demosaicing model configured for that Bayer pattern. For example, the 2×2 Quad-Bayer demosaicing model 330B may remosaic the mosaic images captured using a 2×2 Quad-Bayer pattern into a 1×1 Single-Bayer pattern and perform a demosaicing operation using the 1×1 Single-Bayer demosaicing model 330A. That is, the 2×2 Quad-Bayer demosaicing model 330B may perform a Quad shuffle operation, as described with reference to FIG. 11B, to obtain converted (e.g., remosaiced) mosaic images in the form of a 1×1 Single-Bayer pattern on which a 1×1 Single-Bayer demosaicing operation may be performed.

As another example, the 3×3 Nona-Bayer demosaicing model 330C may remosaic the mosaic images captured using a 3×3 Nona-Bayer pattern into a 1×1 Single-Bayer pattern and perform a demosaicing operation using the 1×1 Single-Bayer demosaicing model 330A. That is, the 3×3 Nona-Bayer demosaicing model 330C may perform a Nona shuffle operation, as described with reference to FIG. 11A, to obtain converted (e.g., remosaiced) mosaic images in the form of a 1×1 Single-Bayer pattern on which a 1×1 Single-Bayer demosaicing operation may be performed. However, the present disclosure is not limited in this regard, and the mosaic images may be remosaiced (e.g., converted, shuffled) into other mosaic patterns and demosaiced.

Such an approach may be preferable as the demosaicing operations may be performed using a single demosaicing model (e.g., the 1×1 Single-Bayer demosaicing model 330A), thereby potentially reducing resource overhead needed to perform demosaicing using multiple demosaicing models 330 (e.g., the 1×1 Single-Bayer demosaicing model 330A, the 2×2 Quad-Bayer demosaicing model 330B, and the 3×3 Nona-Bayer demosaicing model 330C). However, the remosaicing operations may introduce artifacts (e.g., noise, distortion, or the like) to the resulting demosaiced images.

In addition, the approaches discussed above with reference to FIG. 3 may not address the additional resource overhead (e.g., memory footprint, processing load, or the like) that may be needed to use individual demosaicing models 330 for each imaging sensor 322 of the device 100. For example, when a user of the device 100 dynamically changes a zoom factor of an image to be captured, the device 100 (e.g., the image signal processor) may need to switch from a first imaging sensor 322 to a second imaging sensor 322. Such a switch may necessitate a change in the demosaicing model 330 needed to process the mosaic images outputted by the second imaging sensor 322, which may impact performance and/or user experience of the device 100 as a switching delay may be introduced. The effects of the switching delay may be reduced and/or eliminated by pre-loading the demosaicing models 330 on the device 100, which may significantly increase the memory requirements (e.g., footprint, speed) of the device 100. Aspects of the present disclosure provide for a unified demosaicing model that may be used to demosaic mosaic images that may have been captured by imaging sensors using multiple mosaic layout patterns, as described with reference to FIG. 4.

Figure 4:
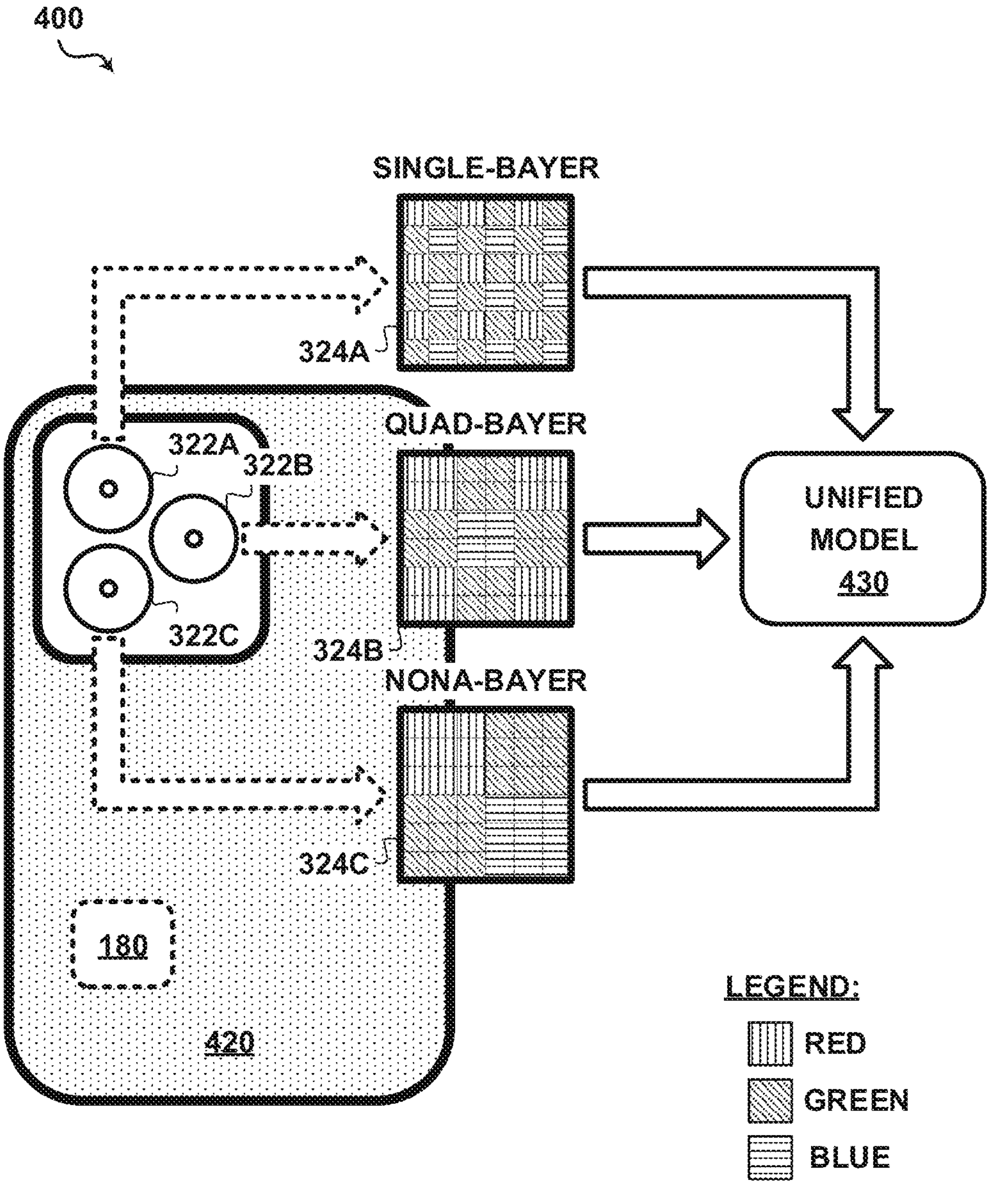
FIG. 4 illustrates an example of a mobile device with multiple cameras, in accordance with various aspects of the present disclosure.

FIG. 4 illustrates an example of a mobile device with multiple cameras, in accordance with various aspects of the present disclosure. Referring to FIG. 4, a mobile device 420 is illustrated. The mobile device 420 may include and/or may be similar in many respects to the device 100 and the mobile device 320 described above with reference to FIGS. 1 to 3, and may include additional features not mentioned above. For example, the mobile device 420 may include a processor 120, a memory 130, a storage component 140, an input component 150, an output component 160, a communication interface 170, and a demosaicing component 180, as described with reference to FIG. 1. As another example, the mobile device 420 may include the plurality of imaging sensors 322 having the corresponding mosaic patterns 324, as described with reference to FIG. 3. Consequently, repeated descriptions of the mobile device 420 described above with reference to FIGS. 1 to 3 may be omitted for the sake of brevity.

In an embodiment, at least a portion of the demosaicing operations as described with reference to FIGS. 1 to 3 may be performed by the mobile device 420, which may include the demosaicing component 180. Alternatively or additionally, another computing device (e.g., a UE, a server, a laptop, a smartphone, a camera, a wearable device, a smart device, a TV, a printer, an IoT device, or the like) that may include the demosaicing component 180 may perform at least a portion of the demosaicing operations. That is, the mobile device 420 may perform a portion of the demosaicing operations as described with reference to FIG. 4 and a remaining portion of the demosaicing operations may be performed by one or more other computing devices.

As shown in FIG. 4, the mobile device 420 may be configured to demosaic the mosaic images outputted by the plurality of imaging sensors 322 with a unified demosaicing model 430. For example, the mobile device 420 may demosaic the mosaic images captured using a 1×1 Single-Bayer pattern 324A and outputted by the first imaging sensor 322A with the unified demosaicing model 430, the mosaic images captured using a 2×2 Quad-Bayer pattern 324B and outputted by the second imaging sensor 322B with the unified demosaicing model 430, and the mosaic images captured using a 3×3 Nona-Bayer pattern 324C and outputted by the third imaging sensor 322C with the unified demosaicing model 430. The unified demosaicing model 430 is further described with reference to FIGS. 12 to 14.

That is, the mobile device 420 may be configured to use the unified demosaicing model 430 that may be capable of directly demosaicing mosaic images that may have been captured using any of the mosaic patterns 324 used by the plurality of imaging sensors 322. As such, the unified demosaicing model 430 may have a potentially reduced resource overhead (e.g., memory footprint, processing load, or the like) when compared with the approaches described with reference to FIG. 3. In addition, the unified demosaicing model 430 may avoid the need for remosaicing, which may introduce artifacts (e.g., noise, distortion, or the like) to the resulting demosaiced images, and/or the need to switch between multiple demosaicing models 330, which may introduce a performance delay.

As described in further detail below with reference to FIGS. 5 to 17, the unified demosaicing model 430 may be further configured to reduce and/or potentially eliminate various noise levels from the mosaic images. Furthermore, the unified demosaicing model 430 may be further configured to correct the resulting demosaiced images for the presence of dead pixels in the plurality of imaging sensors 322.

Figure 5:
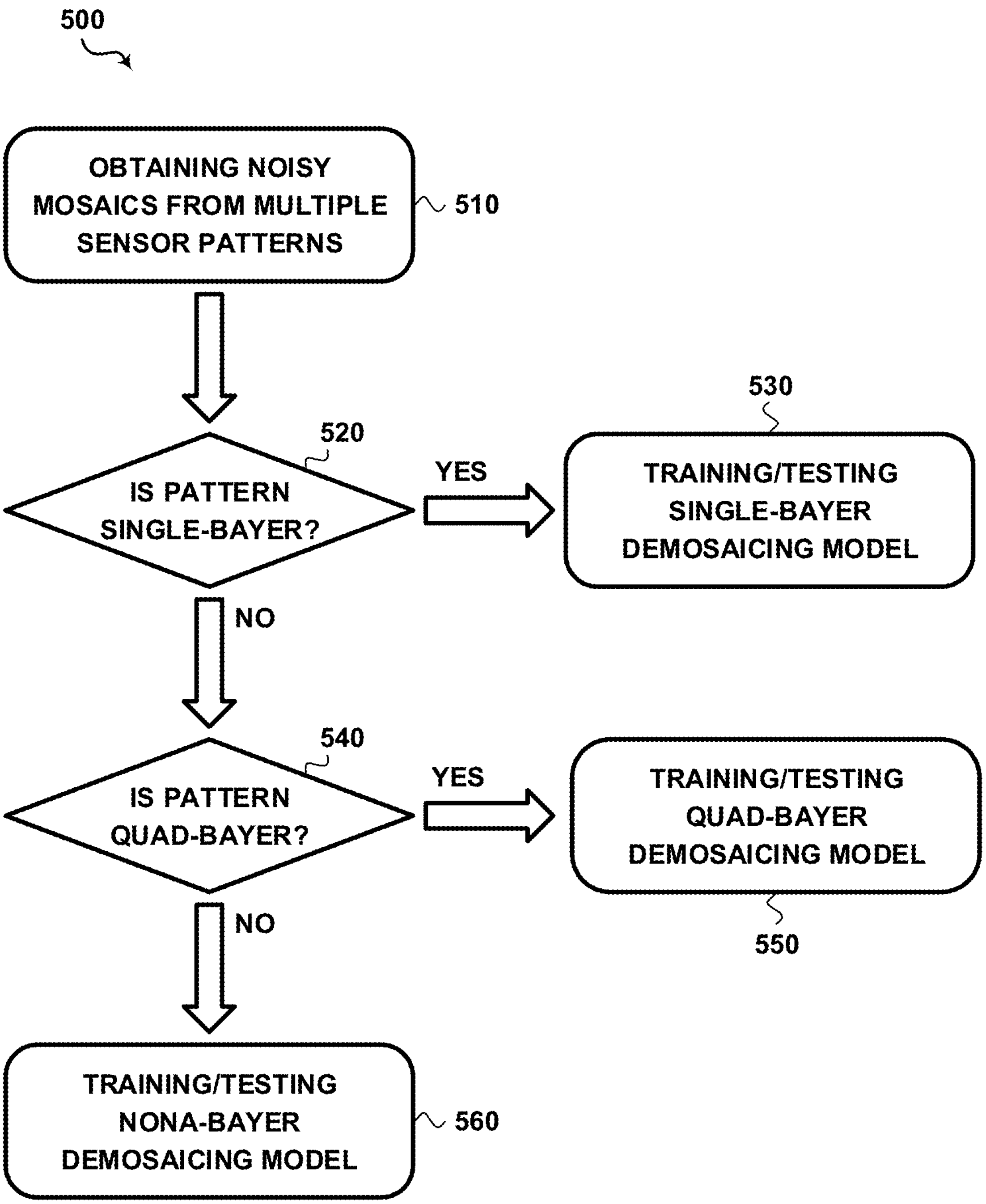
FIG. 5 depicts a flowchart for selecting a demosaicing model, in accordance with various aspects of the present disclosure.

FIG. 5 depicts a flowchart for selecting a demosaicing model, in accordance with various aspects of the present disclosure.

Referring to FIG. 5, a flowchart of an example method 500 for selecting a demosaicing model 330 by a device (e.g., device 100 or mobile device 320) that implements one or more aspects of the present disclosure is illustrated. In some embodiments, at least a portion of the method 500 may be performed by a device, which may include the demosaicing component 180. Alternatively or additionally, another computing device (e.g., a UE, a server, a laptop, a smartphone, a camera, a wearable device, a smart device, a TV, a printer, an IoT device, or the like) that includes the demosaicing component 180 may perform at least a portion of the method 500. For example, in some embodiments, the device and the other computing device may perform the method 500 in conjunction. That is, the device may perform a portion of the method 500 and a remaining portion of the method 500 may be performed by one or more other computing devices.

At block 510 of FIG. 5, the method 500 may include obtaining (e.g., receiving, acquiring, accessing, or the like) mosaic images (e.g., RAW image data) that may have been acquired by a plurality of imaging sensors 322 having one or more mosaic sensor patterns 324. In an embodiment, the mosaic images may include a plurality of noisy mosaic images. That is, the mosaic images may include mosaic images with one or more levels of noise. Alternatively or additionally, the mosaic images may include mosaic images without noise. That is, the mosaic images may include mosaic images that may have been previously denoised and/or that may have been captured under conditions in which the noise level is effectively zero.

At block 520, the method 500 may include determining whether a mosaic image has been captured using a 1×1 Single-Bayer pattern 324A. When the mosaic image is determined to have been captured using the 1×1 Single-Bayer pattern 324A (YES on block 520), the method 500 may proceed to block 530, and train a 1×1 Single-Bayer demosaicing model 330A using the mosaic image and/or demosaic the mosaic image with the 1×1 Single-Bayer demosaicing model 330A. That is, the method 500 may perform demosaicing on the mosaic image using the 1×1 Single-Bayer demosaicing model 330A. Alternatively or additionally, when the mosaic image is determined to not have been captured using the 1×1 Single-Bayer pattern 324A (NO on block 520), the method 500 may proceed to block 540.

At block 540, the method 500 may include determining whether the mosaic image has been captured using a 2×2 Quad-Bayer pattern 324B. When the mosaic image is determined to have been captured using the 2×2 Quad-Bayer pattern 324B (YES on block 540), the method 500 may proceed to block 550, and train a 2×2 Quad-Bayer demosaicing model 330B using the mosaic image and/or demosaic the mosaic image with the 2×2 Quad-Bayer demosaicing model 330B. That is, the method 500 may perform demosaicing on the mosaic image using the 2×2 Quad-Bayer demosaicing model 330B. Alternatively or additionally, when the mosaic image is determined to not have been captured using the 2×2 Quad-Bayer pattern 324B (NO on block 520), the method 500 may proceed to block 560.

At block 560, the method 500 may include training and/or testing of a 3×3 Nona-Bayer demosaicing model 330C. That is, the method 500 may train the 3×3 Nona-Bayer demosaicing model 330C using the mosaic image and/or perform demosaicing on the mosaic image using the 3×3 Nona-Bayer demosaicing model 330C.

Figure 6:
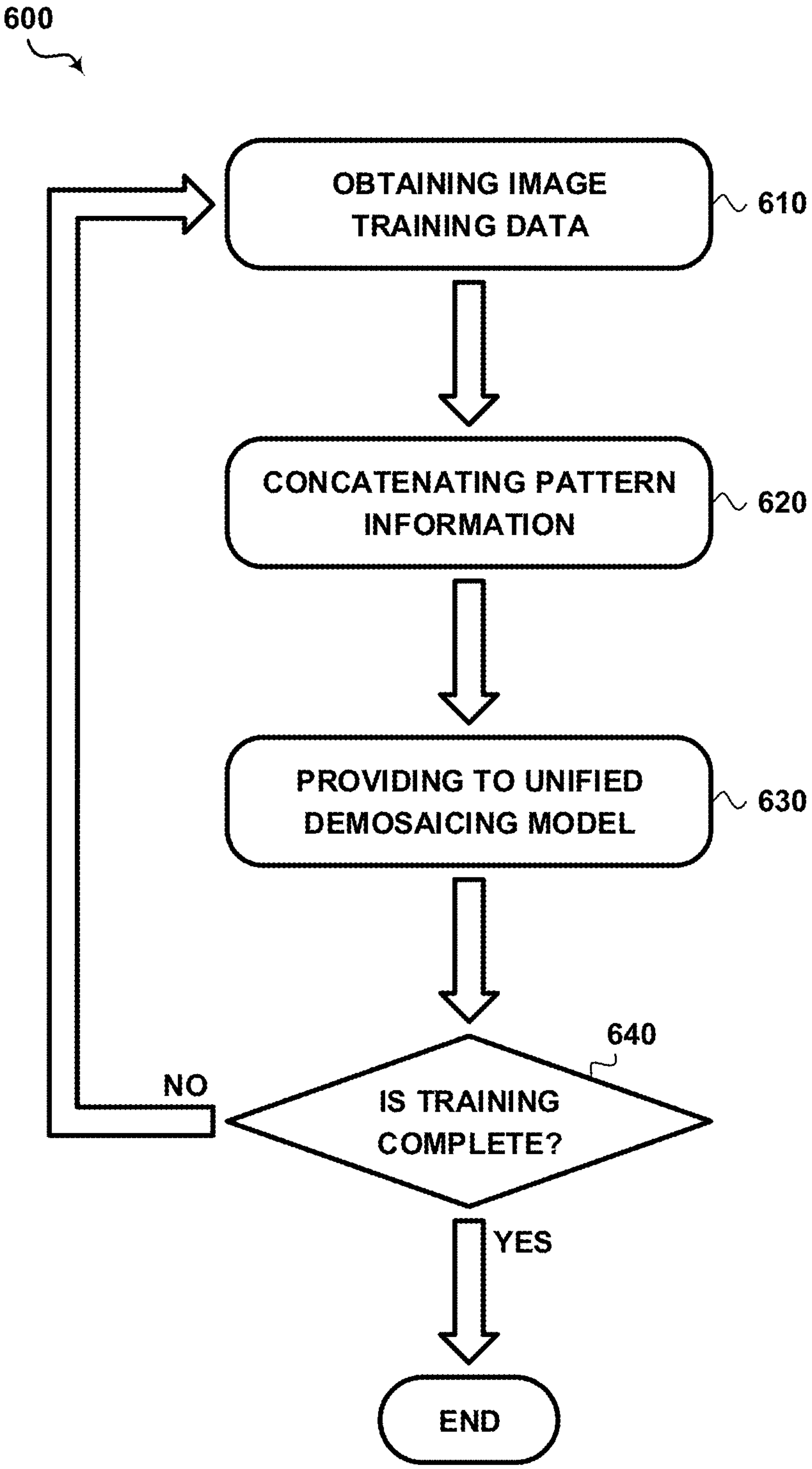
FIG. 6 illustrates a flowchart of an example training phase of a unified demosaicing model, in accordance with various aspects of the present disclosure.

FIG. 6 illustrates a flowchart of an example training phase of a unified demosaicing model, in accordance with various aspects of the present disclosure.

Referring to FIG. 6, a training method 600 of a unified demosaicing model 430 performed by a device (e.g., device 100 or mobile device 420) that implements one or more aspects of the present disclosure is illustrated. In some embodiments, at least a portion of the training method 600 may be performed by a device, which may include the demosaicing component 180. Alternatively or additionally, another computing device (e.g., a UE, a server, a laptop, a smartphone, a camera, a wearable device, a smart device, a TV, a printer, an IoT device, or the like) that includes the demosaicing component 180 may perform at least a portion of the training method 600. For example, in some embodiments, the device and the other computing device may perform the training method 600 in conjunction. That is, the device may perform a portion of the training method 600 and a remaining portion of the training method 600 may be performed by one or more other computing devices.

As shown in FIG. 6, in block 610, the training method 600 may include obtaining (e.g., receiving, acquiring, accessing, or the like) a batch of training image data (e.g., RAW image data) that may have been generated from one or more mosaic sensor patterns 324 that may be targeted for the final unified demosaicing model 430. For example, the batch of training image data may have been generated from the 1×1 Single-Bayer pattern 324A, the 2×2 Quad-Bayer pattern 324B, the 3×3 Nona-Bayer pattern 324C, and/or the QxQ Bayer pattern. However, the present disclosure is not limited in this regard, and other training image data that may have been generated from other mosaic patterns may be used.

Alternatively or additionally, the training image data may include a plurality of noisy mosaic images. That is, the training image data may include mosaic images with one or more levels of noise. In an embodiment, the training image data may include RAW images from a training dataset as described with reference to FIGS. 10A and 10B.

In block 620, the training method 600 may include concatenating pattern information to the training image data. For example, each image of the plurality of mosaic images may be concatenated with encoded embeddings of a corresponding targeted mosaic pattern 324. In an embodiment, the encoded embeddings may indicate the corresponding mosaic pattern 324. For example, the encoded embeddings may include a value that may correspond to a predetermined mosaic pattern (e.g., the 1×1 Single-Bayer pattern 324A, the 2×2 Quad-Bayer pattern 324B, or the 3×3 Nona-Bayer pattern 324C).

Alternatively or additionally, the encoded embeddings may include positional information of one or more colors of the corresponding mosaic pattern 324. For example, the encoded embeddings may indicate the locations of each of the color filters of the corresponding mosaic pattern 324. That is, the encoded embeddings may include one or more one-hot encoding patterns that may correspond to a sensor mosaic layout pattern of the corresponding imaging sensor 322. In an embodiment, each of the one or more one-hot encoding patterns may correspond to a location and/or position of a color of the mosaic pattern 324. For example, for any spatial location within the mosaic pattern, one of the one-hot pattern embeddings may be active (e.g., hot, high, one, "1", or the like) for one of the color filters.

However, the present disclosure is not limited in this regard, and the encoded embeddings may include other information that may assist in the identification of the mosaic layout pattern of the training image data. Notably, the encoded embeddings may include information that may describe a mosaic pattern of the imaging sensor.

In block 630, the training method 600 may include providing the training image data concatenated with the encoded embeddings to a unified demosaicing model 430. In an embodiment, the unified demosaicing model 430 may be provided a plurality of channels including the training image data and the encoded embeddings. For example, the plurality of channels may include a channel containing the training image data and individual channels for each of the colors in the mosaic patterns 324. In such an example, when the mosaic patterns 324 correspond to RGB imaging sensors 322, the unified demosaicing model 430 may be provided four (4) channels in which a first channel includes the training image data, a second channel includes one-hot pattern embedding data for the red (R) color, a third channel includes one-hot pattern embedding data for the green (G) color, and a fourth channel includes one-hot pattern embedding data for the blue (B) color. As another example, the plurality of channels may include individual channels for each of the colors in the mosaic patterns 324, in which the location and/or position of a color of the mosaic pattern 324 in the channel is set to the corresponding color value for that location in the training image data. In such an example, when the mosaic patterns 324 correspond to RGB imaging sensors 322, the unified demosaicing model 430 may be provided three (3) channels in which a first channel includes the red (R) values of the training image data corresponding to the mosaic pattern, a second channel includes the green (G) values of the training image data corresponding to the mosaic pattern, and a third channel includes the blue (B) values of the training image data corresponding to the mosaic pattern.

In block 640, the training method 600 may include determining whether the training phase of the unified demosaicing model 430 is completed. If or when the training phase of the unified demosaicing model 430 has been determined to be completed, the training method 600 may terminate. Alternatively or additionally, if or when the training phase of the unified demosaicing model 430 has been determined to not be completed, the training method 600 may return to block 610 and process another batch of image training data. The subsequent batch of image training data may be the same and/or different from a previous batch of image training data. Alternatively or additionally, one or more weights and/or hyperparameters of the unified demosaicing model 430 may be adjusted prior to returning to block 610.

In an embodiment, the training phase of the unified demosaicing model 430 may be determined to be completed based on a number of iterations that have been completed. For example, the training phase may be determined to be completed if or when the number of iterations that have been completed exceeds a predetermined count threshold. In such an embodiment, the predetermined count threshold may be dynamically adjusted based on the image training data. That is, the predetermined count threshold may differ based on one or more characteristics (e.g., complexity, size, or the like) of the image training data.

Alternatively or additionally, the training phase of the unified demosaicing model 430 may be determined to be completed based on an analysis of the output of the unified demosaicing model 430. For example, the demosaiced images outputted by the unified demosaicing model 430 may be compared with ground-truth demosaiced images corresponding to the image training data.

In an embodiment, the quality of the demosaiced images provided by the unified demosaicing model 430 may be evaluated using one or more metrics that may interpret the demosaiced images in terms of human perception. In such an embodiment, the training phase of the unified demosaicing model 430 may be determined to be completed based on the quality of the demosaiced images exceeding a predetermined quality threshold. For example, in an embodiment, a CIE 1976 (CIE76) average color difference $\Delta E$ may be used to evaluate the unified demosaicing model 430. In such an example, two (2) colors having an average color difference less than or equal to two (2) (e.g., $\Delta E \leq 2$) may be considered as being indistinguishable for an average observer. However, the present disclosure is not limited in this regard, and the quality of the demosaiced images provided by the unified demosaicing model 430 may be evaluated using other metrics.

In an embodiment, the training phase of the unified demosaicing model 430 may be determined to be completed based on a calculation of a loss of the unified demosaicing model 430. In such an embodiment, the training phase of the unified demosaicing model 430 may be determined to be completed if or when the loss value is less than or equal to a predetermined loss threshold, if or when the loss value reaches a minimum value, and/or if or when the loss value decreases by a relatively small amount over a predetermined number of iterations. However, the present disclosure is not limited in this regard, and the training phase of the unified demosaicing model 430 may be determined to be completed using other conditions.

In an embodiment, the loss of the unified demosaicing model 430 may be calculated using one or more functions that may include well-known functions for determining a loss of a machine learning model. For example, the loss may correspond to, but not be limited to, at least one of a mean absolute error (MAE) loss (L1 loss), an adversarial loss, a ΔE color loss, a mean square error (MSE) loss (L2 loss), a cross-entropy loss, or a combination thereof.

The training method 600 may also be used to validate the training of the unified demosaicing model 430. That is, the unified demosaicing model 430 may be validated by performing the training method 600. In such an embodiment, the validating of the unified demosaicing model 430 may differ from the training method 600 in that the weights and/or hyperparameters of the unified demosaicing model 430. Alternatively or additionally, the training image data used for validating the unified demosaicing model 430 may be different from the training image data used to train the unified demosaicing model 430.

In an embodiment, the validated unified demosaicing model 430 may be tested using another batch of training image data that may be different from the training image data used to train and to validate the unified demosaicing model 430.

Figure 7:
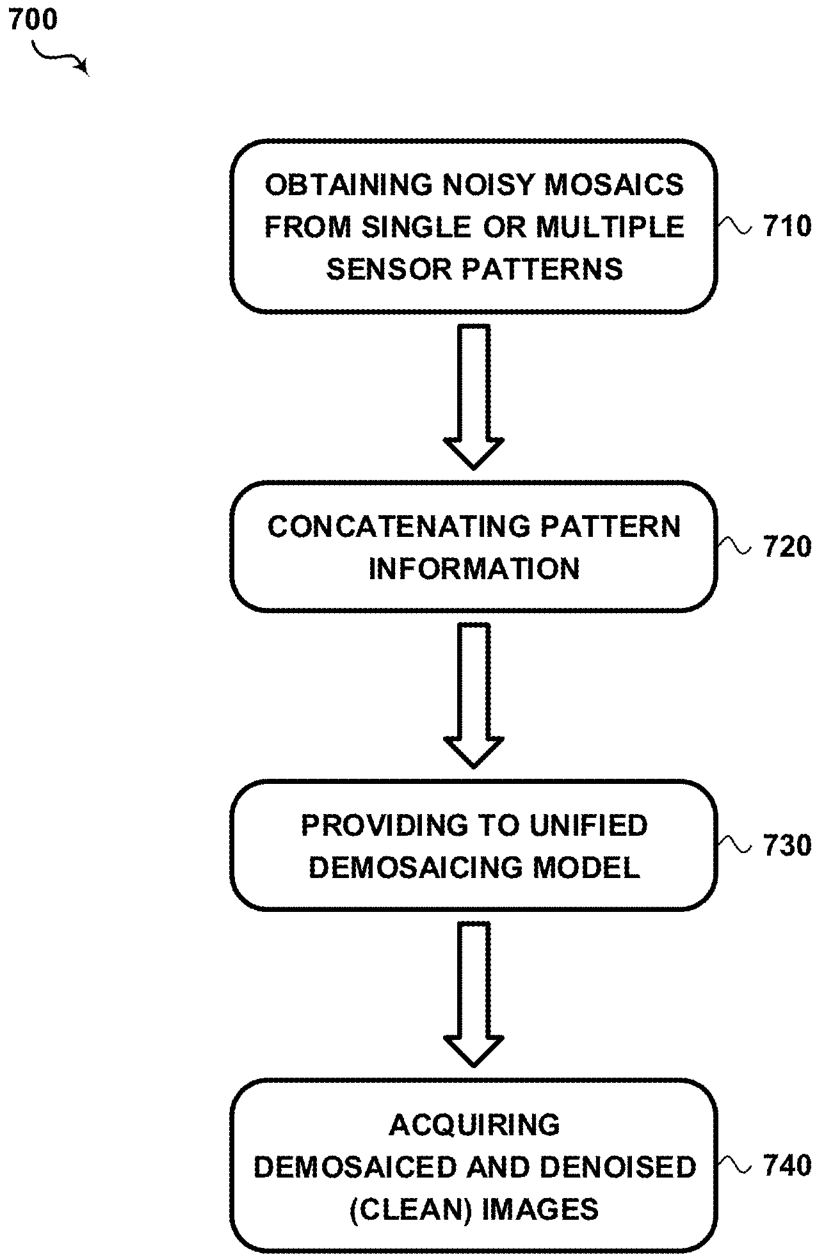
FIG. 7 depicts a flowchart of an example inference phase of a unified demosaicing model, in accordance with various aspects of the present disclosure.

FIG. 7 depicts a flowchart of an example inference phase of a unified demosaicing model 430, in accordance with various aspects of the present disclosure.

Referring to FIG. 7, an inference method 700 of a unified demosaicing model 430 performed by a device (e.g., device 100 or mobile device 420) that implements one or more aspects of the present disclosure is illustrated. In some embodiments, at least a portion of the inference method 700 may be performed by a device, which may include the demosaicing component 180. Alternatively or additionally, another computing device (e.g., a UE, a server, a laptop, a smartphone, a camera, a wearable device, a smart device, a TV, a printer, an IoT device, or the like) that includes the demosaicing component 180 may perform at least a portion of the inference method 700. For example, in some embodiments, the device and the other computing device may perform the inference method 700 in conjunction. That is, the device may perform a portion of the inference method 700 and a remaining portion of the inference method 700 may be performed by one or more other computing devices.

As shown in FIG. 7, in block 710, the method 700 may include obtaining (e.g., receiving, acquiring, accessing, or the like) mosaic images (e.g., RAW image data) that may have been acquired by a plurality of imaging sensors 322 having one or more mosaic sensor patterns 324. For example, the mosaic images may have been generated from the 1×1 Single-Bayer pattern 324A, the 2×2 Quad-Bayer pattern 324B, the 3×3 Nona-Bayer pattern 324C, and/or the Q×Q Bayer pattern. However, the present disclosure is not limited in this regard, and the mosaic images may have been generated from other mosaic patterns. In an embodiment, the mosaic images may include a plurality of noisy mosaic images. That is, the mosaic images may include mosaic images with one or more levels of noise. Alternatively or additionally, the mosaic images may include mosaic images without noise. That is, the mosaic images may include mosaic images that may have been previously denoised and/or that may have been captured under conditions in which the noise level is effectively zero.

In block 720, the inference method 700 may include concatenating pattern information to the mosaic images. The operations performed in block 720 may include and/or may be similar in many respects to the operations described above with reference to block 620 of the training method 600 illustrated in FIG. 6, and may include additional operations not mentioned above. Consequently, repeated descriptions of block 720 described above with reference to FIG. 6 may be omitted for the sake of brevity.

In block 730, the inference method 700 may include providing the mosaic images data concatenated with the encoded embeddings to a unified demosaicing model 430. The operations performed in block 730 may include and/or may be similar in many respects to the operations described above with reference to block 630 of the training method 600 illustrated in FIG. 6, and may include additional operations not mentioned above. Consequently, repeated descriptions of block 730 described above with reference to FIG. 6 may be omitted for the sake of brevity. For example, the unified demosaicing model 430 in block 730 may have been trained, validated, and/or tested as described above with reference to FIG. 6.

In block 740, the inference method 700 may include acquiring, from the unified demosaicing model 430, a plurality of demosaiced images corresponding to the mosaic images. In an embodiment, the plurality of demosaiced images may be provided to a device (e.g., device 100) for further processing and/or display to a user, for example.

Advantageously, the training method 600 and the inference method 700 provide a unified demosaicing model 430 capable of demosaicing and/or denoising mosaic images that may have been captured using multiple sensor mosaic layouts without a need to switch between different models that may be configured to a specific mosaic layout. By jointly training the unified demosaicing model 430 with training image data for one or more targeted mosaic layouts, the resulting unified demosaicing model 430 may perform demosaicing and/or denoising on mosaic images captured using the one or more targeted mosaic layouts. In addition, by having a single model rather than corresponding models for each of the targeted mosaic layouts, the unified demosaicing model 430 may incur a reduced resource overhead (e.g., memory footprint, processing load, or the like) when compared with related demosaicing models.

Furthermore, the encoded embeddings, which may indicate the location and/or position of each color of the mosaic pattern 324, may also be modified to reflect pixels that may be dropped from the mosaic pattern 324. For example, each imaging sensor of the plurality of imaging sensors 322 may have one or more color pixels that may be malfunctioning and/or off (e.g., "dead"). The color pixels may be dead due to manufacturing errors, physical damage (e.g., dust, water, physical impact, or the like), broken electrical connections, or the like. However, the present disclosure is not limited in this regard, and the pixels may no longer function due to other factors. Notably, the number of dead pixels may account for a significant portion of the total number of pixels in the imaging sensor 322 (e.g., about 1% of the total number of pixels).

Related imaging sensors and/or devices may attempt to correct for dead pixels by interpolating pixels of the mosaic images prior to performing demosaicing. For example, the interpolating may include replacing the dead pixel values with a weighted average of surrounding pixels with the same color channel. However, such interpolation techniques and/or calculations may be imperfect and may introduce artifacts in the final image.

Aspects of the present disclosure provide for a mosaic maskout augmentation to the embodiments described above that may be used to correct for dead pixels. The mosaic maskout may allow the unified demosaicing model 430 to provide demosaiced and denoised images from imaging data that may include dead pixels, as described with reference to FIGS. 8 and 9. For example, during the training phase, the mosaic maskout may remove (e.g., set to a zero (0) value) different portions of pixels in the encoded embeddings, and, in the interference phase, the encoded embeddings may be modified to reflect which pixels may be dead (e.g., dropped) from the mosaic patterns 324.

Figure 8:
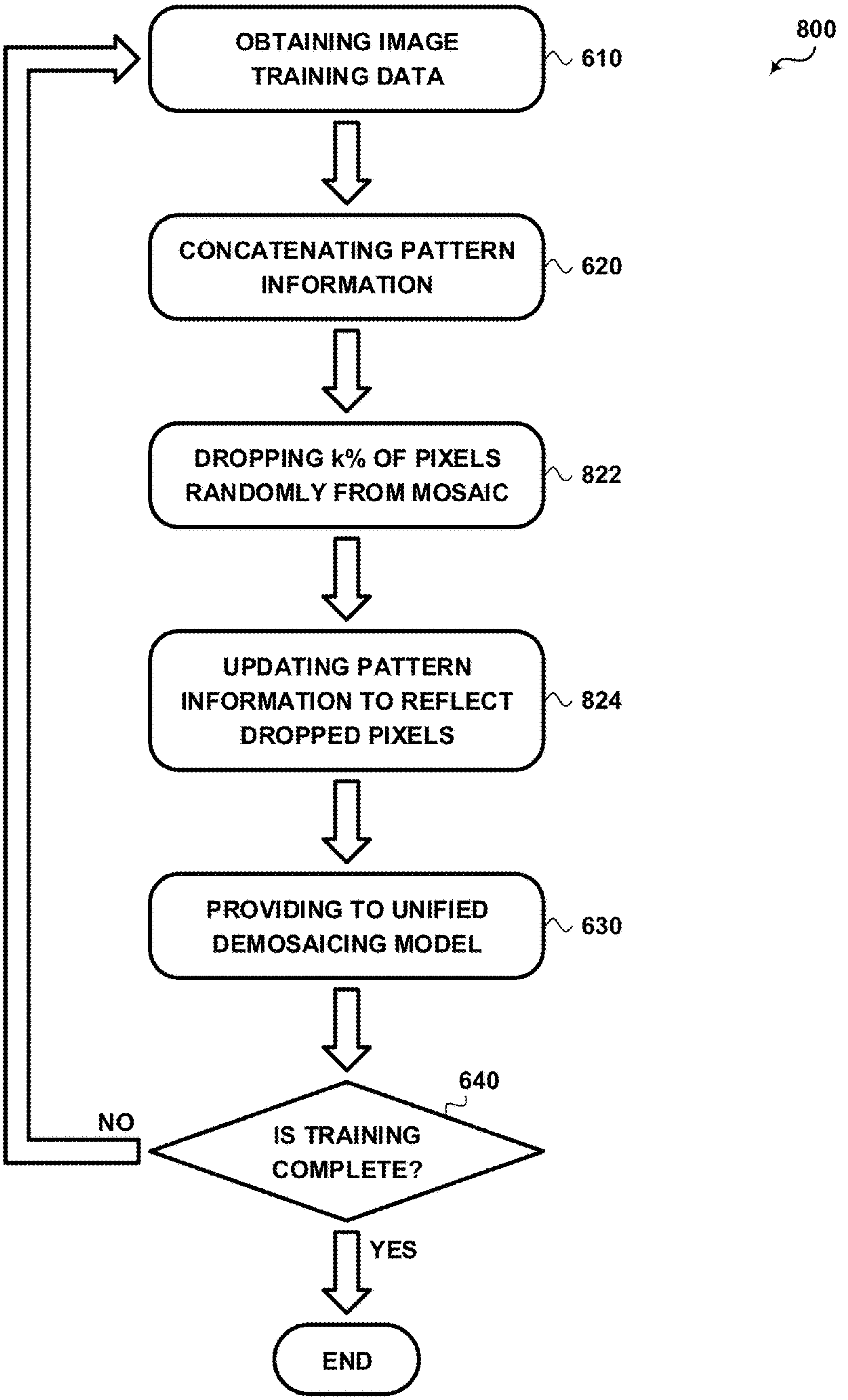
FIG. 8 illustrates a flowchart of an example training phase with mosaic maskout of a unified demosaicing model, in accordance with various aspects of the present disclosure.

FIG. 8 illustrates a flowchart of an example training phase with mosaic maskout of a unified demosaicing model, in accordance with various aspects of the present disclosure.

Referring to FIG. 8, a training method 800 of a unified demosaicing model 430 performed by a device (e.g., device 100 or mobile device 420) that implements one or more aspects of the present disclosure is illustrated. In some embodiments, at least a portion of the training method 800 may be performed by a device, which may include the demosaicing component 180. Alternatively or additionally, another computing device (e.g., a UE, a server, a laptop, a smartphone, a camera, a wearable device, a smart device, a TV, a printer, an IoT device, or the like) that includes the demosaicing component 180 may perform at least a portion of the training method 800. For example, in some embodiments, the device and the other computing device may perform the training method 800 in conjunction. That is, the device may perform a portion of the training method 800 and a remaining portion of the training method 800 may be performed by one or more other computing devices.

The training method 800 may include and/or may be similar in many respects to the training method 600 described above with reference to FIG. 6, and may include additional operations not mentioned above. For example, the training method 800 may include the operations described above with reference to blocks 610, 620, 630, and 640 of the training method 600. Consequently, repeated descriptions of the training method 800 described above with reference to FIG. 6 may be omitted for the sake of brevity.

In block 822, the training method 800 may include randomly dropping k % pixels from each of the plurality of mosaic patterns 324, where k is a positive value ranging from 0% to 100%. That is, a number of pixels in the plurality of mosaic patterns 324 may be masked out (e.g., set to a zero (0) value) so as to simulate dead pixels in the imaging sensors 322. In an embodiment, the number of dropped pixels may be selected to fall in a range from 0% to 5% of the total number of pixels in the mosaic pattern 324 (e.g., $0\% \leq k \leq 5\%$). For example, the number of dropped pixels may be determined to be 0% (e.g., k=0%) such that the unified demosaicing model 430 may be able to perform demosaicing of mosaic images if or when the imaging sensors 322 do not any dropped (e.g., dead) pixels. Alternatively or additionally, the number of dropped pixels may be determined to be greater than 0% and less than or equal to 5% (e.g., $0\% < k \leq 5\%$). However, the present disclosure is not limited in this regard, and the number of dropped pixels may be determined in another manner and/or may be selected from a different range of values (e.g., $0\% \leq k \leq 1\%$).

In an embodiment, the number of dropped pixels may be determined for each iteration of the training phase of the unified demosaicing model 430. For example, the number of dropped pixels may be randomly determined at each iteration of the training phase such that a different number of pixels may be dropped at each iteration of the training phase of the unified demosaicing model 430. However, the present disclosure is not limited in this regard.

In block 824, the training method 800 may include updating the pattern information that has been concatenated to the training image data in block 620 based on the number of dropped pixels determined in block 822. In an embodiment, each of the mosaic patterns 324 may have k % pixels dropped (e.g., set to a zero (0) value). For example, the dropped pixels may be randomly selected for each of the mosaic patterns 324. Alternatively or additionally, the dropped pixels may be selected for each iteration of the training phase of the unified demosaicing model 430. That is, subsequent training iterations may have a different number (e.g., a different k %) of dropped pixels and/or may have a different set of dropped pixels than previous iterations. However, the present disclosure is not limited in this regard, and the dropped pixels may be selected in other manners without deviating from the scope of the present disclosure.

For example, in a case where k is equal to 1% (e.g., k=1%), the 1×1 Single-Bayer pattern 324A, the 2×2 Quad-Bayer pattern 324B, and the 3×3 Nona-Bayer pattern 324C may each be updated to drop 1% of their respective pixels, and the corresponding pattern information that has been concatenated to the training image data may also be updated. However, the present disclosure is not limited in this regard. In an embodiment, each of the mosaic patterns 324 may have different numbers of dropped pixels.

In block 630, the training method 800 may provide the training imaging data with the updated pattern information to the unified demosaicing model 430. In this manner, the unified demosaicing model 430 may be configured to correct for dead pixels in the imaging sensors during the inference phase of the unified demosaicing model 430, as described with reference to FIG. 9.

Although FIG. 8 illustrates blocks 610 through 640 of the training method 800 being performed in a particular order, it is to be understood that the present disclosure is not limited in this regard. For example, block 822 and/or block 824 may be performed prior to block 620 without departing from the scope of the present disclosure.

Figure 9:
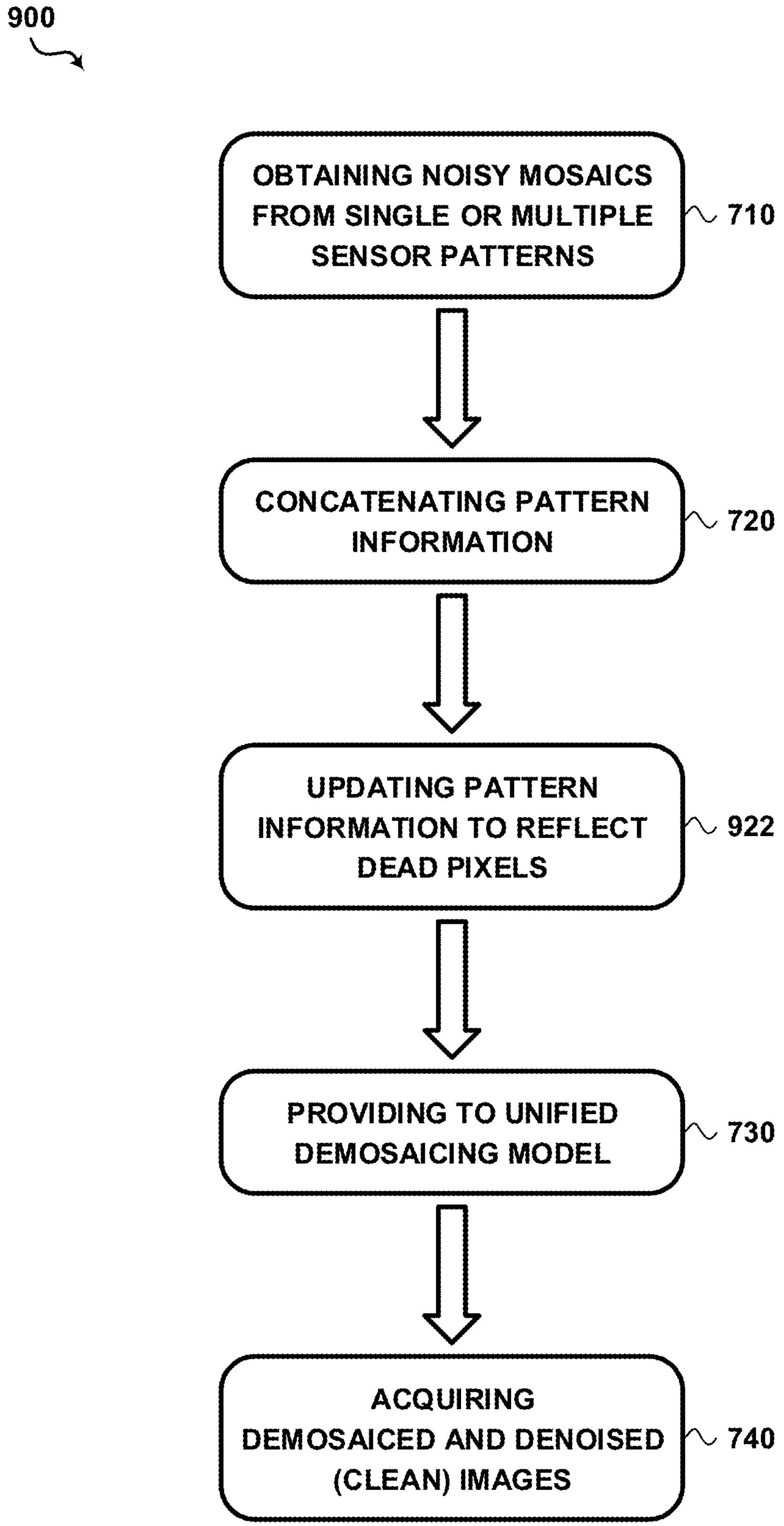
FIG. 9 depicts a flowchart of an example inference phase with mosaic maskout of a unified demosaicing model, in accordance with various aspects of the present disclosure.

FIG. 9 depicts a flowchart of an example inference phase with mosaic maskout of a unified demosaicing model 430, in accordance with various aspects of the present disclosure;

Referring to FIG. 9, an inference method 900 of a unified demosaicing model 430 performed by a device (e.g., device 100 or mobile device 420) that implements one or more aspects of the present disclosure is illustrated. In some embodiments, at least a portion of the inference method 900 may be performed by a device, which may include the demosaicing component 180. Alternatively or additionally, another computing device (e.g., a UE, a server, a laptop, a smartphone, a camera, a wearable device, a smart device, a TV, a printer, an IoT device, or the like) that includes the demosaicing component 180 may perform at least a portion of the inference method 900. For example, in some embodiments, the device and the other computing device may perform the inference method 900 in conjunction. That is, the device may perform a portion of the inference method 900 and a remaining portion of the inference method 900 may be performed by one or more other computing devices.

The inference method 900 may include and/or may be similar in many respects to the inference method 700 described above with reference to FIG. 7, and may include additional operations not mentioned above. For example, the inference method 900 may include the operations described above with reference to blocks 710, 720, 730, and 740 of the inference method 700. Consequently, repeated descriptions of the inference method 900 described above with reference to FIG. 7 may be omitted for the sake of brevity.

In block 922, the inference method 900 may include updating the pattern information that has been concatenated to the mosaic images in block 720 based on a dead pixel mask of the corresponding imaging sensor 322. The dead pixel mask may indicate one or more pixels of the corresponding imaging sensor 322 that may be malfunctioning and/or may be dead, and thus, should be dropped from the demosaicing operations. In an embodiment, the dead pixel mask may be calibrated by a manufacturer of the imaging sensor. Alternatively or additionally, the dead pixel mask may be updated based on error information provided by the imaging sensor 322. For example, the dead pixel mask may be updated periodically and/or aperiodically based on a configuration event and/or a designated event. However, the present disclosure is not limited in this regard, and the dead pixel mask may be determined and/or updated in other manners without deviating from the scope of the present disclosure.

In block 730, the inference method 900 may provide the mosaic images concatenated with the updated pattern information to the unified demosaicing model 430. In this manner, the unified demosaicing model 430 may correct for dead pixels in the imaging sensors during the inference phase of the unified demosaicing model 430.

That is, in block 740, the inference method 700 may include acquiring, from the unified demosaicing model 430, a plurality of demosaiced images corresponding to the mosaic images that may have been corrected to account for one or more dead pixels in the corresponding imaging sensors 322. In an embodiment, the plurality of demosaiced images may be provided to a device (e.g., device 100) for further processing and/or display to a user, for example.

Although FIG. 9 illustrates blocks 710 through 740 of the inference method 900 being performed in a particular order, it is to be understood that the present disclosure is not limited in this regard. For example, block 922 may be performed prior to block 720 without departing from the scope of the present disclosure.

Advantageously, the training method 800 and the inference method 900 provide a unified demosaicing model 430 capable of demosaicing and/or denoising mosaic images that may have been captured using multiple sensor mosaic layouts without a need to switch between different models that may be configured to a specific mosaic layout. In addition, the unified demosaicing model 430 may correct errors in the mosaic images that may be caused by dead pixels. By jointly training the unified demosaicing model 430 with training image data for one or more targeted mosaic layouts that may have been concatenated with pattern information that has been updated to reflect dead pixels in the imaging sensors, the resulting unified demosaicing model 430 may perform demosaicing and/or denoising, as well as, dead pixel correction, on the mosaic images captured using the one or more targeted mosaic layouts. In addition, by having a single model rather than corresponding models for each of the targeted mosaic layouts, the unified demosaicing model 430 may incur a reduced resource overhead (e.g., memory footprint, processing load, or the like) when compared with related demosaicing models.

Figure 10A:
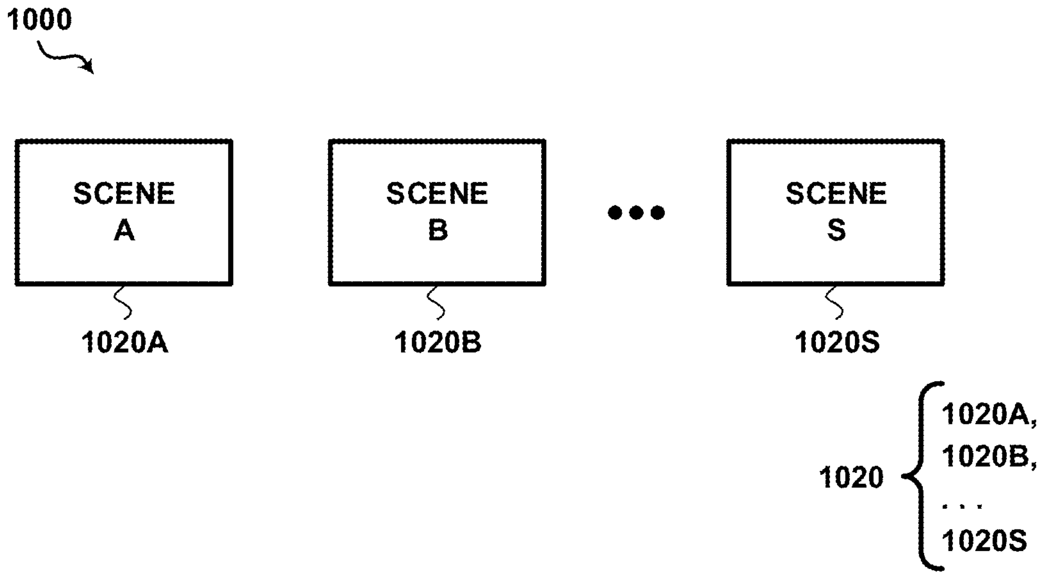
FIGS. 10A and 10B illustrate an example of a training dataset for training a demosaicing model, in accordance with various aspects of the present disclosure.
Figure 10B:
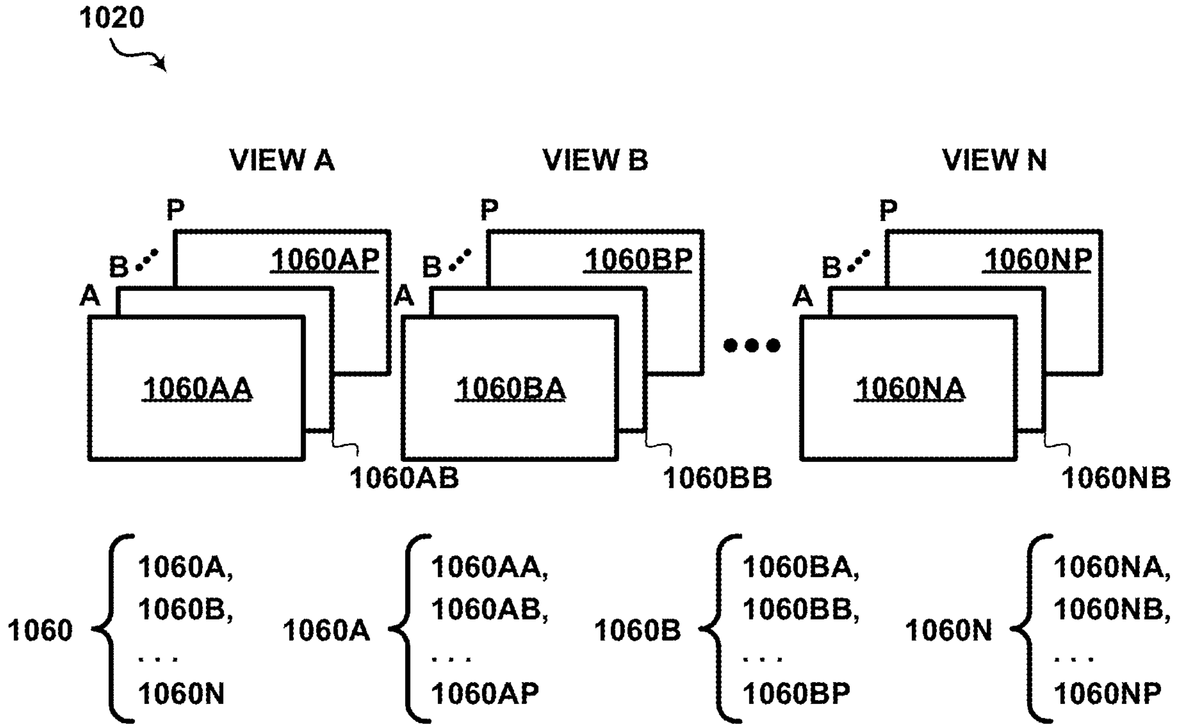

FIGS. 10A and 10B illustrate an example of a training dataset for training a demosaicing model, in accordance with various aspects of the present disclosure. Referring to FIGS. 10A and 10B, a training dataset 1000 is illustrated.

Related learning-based demosaicing models may be trained and/or evaluated using synthesized datasets, which may limit their application in real-world scenarios. These synthesized datasets may be generated by synthesizing Bayer inputs using processed sRGB images that may have been previously demosaiced. As described above, the ISP of an imaging sensor may perform denoising and/or demosaicing operations on RAW sensor images. Consequently, creating a training dataset including RAW images may be preferable over a dataset of synthesized sRGB images. In addition, related training datasets may lack images with high-frequency details that may present a challenge to demosaicing algorithms.

Accordingly, the training dataset 1000 may include a dataset of RAW images that may be constructed to contain high-frequency detail. As used herein, the training dataset 1000 may be referred to as a hard demosaicing dataset (HDD). As shown in FIG. 10A, the training dataset 1000 may include a plurality of scenes 1020 (e.g., a first scene A 1020A, a second scene B 1020B, to an S-th scene S 1020S, where S is a positive integer greater than one (1)).

Each scene 1020 in the training dataset 1000 may include a plurality of RAW images (e.g., 600 RAW images) that may have been constructed to contain a plurality of high-frequency regions by arranging a relatively large number of highly textured and/or small objects within the region. For example, the objects included in the RAW images may have a size less than a predetermined threshold. As used herein, a high-frequency region may refer to a region in an image that may contain fine details such as, but not limited to, hair, texture, pores, lines, skin features, or the like. Alternatively or additionally, a high-frequency region may contain a relatively large collection of different contrasts. In an embodiment, each scene 1020 may include a collection of images of similar objects having different sizes and/or colors, such as, but not limited to, cotton balls, plants, stationery, cosmetics, fuse beads, pompoms, paper confetti, strings, pieces of clothing, ribbons, toy animals, organized toy building blocks, disorganized toy building blocks, sports equipment, paint samples, pony beads, or the like.

Each scene 1020 may include a plurality of RAW images 1060 (e.g., first RAW images 1060A, second RAW images 1060B, to N-th RAW images 1060N) that may be captured from a plurality of viewpoints (e.g., a first viewpoint A, a second viewpoint B, to an N-th viewpoint N, where N is a positive integer greater than one (1)), as shown in FIG. 10B. In a non-limiting embodiment, each scene 1020 may include between 7 and 59 RAW images (e.g., $7 \leq N \leq 59$). For example, the plurality of viewpoints may capture the corresponding scene from a variety of positions, orientations, and/or zoom levels. In an embodiment, the plurality of RAW images 1060 may have a same pixel size (e.g., 8640×5760 pixels). However, the present disclosure is not limited in this regard, and the plurality of RAW images 1060 may have a different pixel size and/or the plurality of RAW images 1060 may have different pixel sizes.

Alternatively or additionally, each view may be captured at a plurality of focuses (e.g., a first focus level A, a second focus level B, to a P-th focus level P, where P is a positive integer greater than one (1)). For example, the RAW images 1060A captured from the first viewpoint A may include a first RAW image 1060AA taken at the first focus level A, a second RAW image 1060AB taken at the second focus level B, to a P-th RAW image 1060AP taken at the P-th focus level P. As another example, the RAW images 1060B captured from the second viewpoint B may include a first RAW image 1060BA taken at the first focus level A, a second RAW image 1060BB taken at the second focus level B, to a P-th RAW image 1060BP taken at the P-th focus level P. As another example, the RAW images 1060N captured from the N-th viewpoint N may include a first RAW image 1060NA taken at the first focus level A, a second RAW image 1060NB taken at the second focus level B, to a P-th RAW image 1060NP taken at the P-th focus level P. In a non-limiting embodiment, each view may include between 1 and 3 focus levels (e.g., 1≤P≤3). Notably, each view may include images at a number of focus levels such that all image regions are in focus in at least one image of the view.

In an embodiment, portions (e.g., patches) of the plurality of RAW images 1060 in the training dataset 1000 may be used for training, validating, and/or testing the unified demosaicing model 430. For example, each patch may include a portion of a RAW image 1060 captured from a particular viewpoint at a particular focus level. Each patch may have a size that may be smaller than the RAW image 1060. For example, a patch may have a size of 48×48 pixels. However, the present disclosure is not limited in this regard, and the patch may have a smaller size (e.g., 32×32 pixels) or a larger size (e.g., 64×64 pixels). Alternatively or additionally, the shape of the patch may be a polygon or another shape.

In an embodiment, the patches may be selected based on criteria for selecting the top "hardest" patches for each viewpoint. That is, the selection criteria may be configured to identify candidate patches based on a level of complexity (e.g., high-frequency details) contained in the patches for each viewpoint. For example, a selection approach may include dividing the RAW images 1060 for each viewpoint (e.g., the first RAW images 1060A, the second RAW images 1060B, to the N-th RAW images 1060N) into a plurality of patches and mosaicing the patches based on a 1×1 Single-Bayer pattern. The selection approach may further include applying a bilinear interpolation to the mosaiced patches, as a form of a simple demosaicing. However, the present disclosure is not limited in this regard, and other forms of demosaicing may be performed on the mosaiced patches. The selection approach may further include sorting the demosaiced patches by one or more complexity criterion (e.g., a reconstruction peak signal-to-noise ratio (PSNR)). The selection approach may further include identifying a top portion (e.g., top 25%) of the sorted demosaiced patches for each viewpoint as the selected training patches for the 1×1 Single-Bayer pattern. The selection approach may be repeated to select training patches for the 2×2 Quad-Bayer pattern and the 3×3 Nona-Bayer pattern by mosaicing the patches based on the 2×2 Quad-Bayer pattern and the 3×3 Nona-Bayer pattern, respectively.

The training dataset 1000 may include training pairs of clean and noisy RAW images and/or patches. In an embodiment, the noisy RAW images may be generated from the corresponding clean RAW images by adding noise from a calibrated noise model and sampling the clean RAW image with a sensor pattern.

In an embodiment, a first portion of the training dataset 1000 may be used for training the unified demosaicing model 430, a second portion of the training dataset 1000 may be used for validating the unified demosaicing model 430, and a third portion of training dataset 1000 may be used for testing the unified demosaicing model 430. The first to third portions of the training dataset 1000 may be different from each other. That is, the RAW images 1060 included in one portion may not be included in another portion of the training dataset 1000. However, the present disclosure is not limited in this regard, and RAW images 1060 may be included in two or more portions of the training dataset 1000. Alternatively or additionally, the sizes (e.g., number of RAW images 1060) of the portions may be the same or may be different from each other. The RAW images 1060 to be included in each portion the training dataset 1000 may be determined based on various criteria and/or design constraints. For example, in a case in which the RAW images 1060 to be included in each portion are determined based on the scenes included in the training dataset 1000 and the training dataset 1000 includes seventeen (17) scenes, the first portion of the training dataset 1000, which may be used for training of the unified demosaicing model 430, may include scenes 1 to 10, the second portion of the training dataset 1000, which may be used for validating of the unified demosaicing model 430, may include scenes 11 and 12, and the third portion of the training dataset 1000, which may be used for testing of the unified demosaicing model 430, may include scenes 13 to 17.

Advantageously, the training dataset 1000 may contain challenging scenes with hard patches that may have been annotated for training, validation, and/or testing of a demosaicing model. In addition, by including RAW images of a plurality of scenes having high-frequency details captured at a plurality of viewpoints and a plurality of focus levels, the training dataset 1000 may be preferable over a related dataset of synthesized images as the training dataset 1000 may present a challenge to demosaicing algorithms and may better represent real-world scenarios.

Figure 11A:
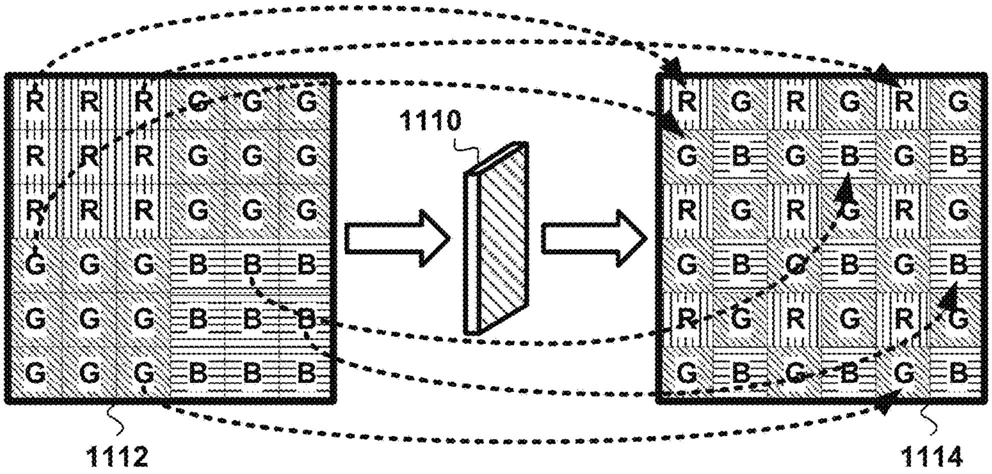
FIG. 11A depicts an example of a Nona shuffling block of a unified demosaicing model, in accordance with various aspects of the present disclosure.
Figure 11B:
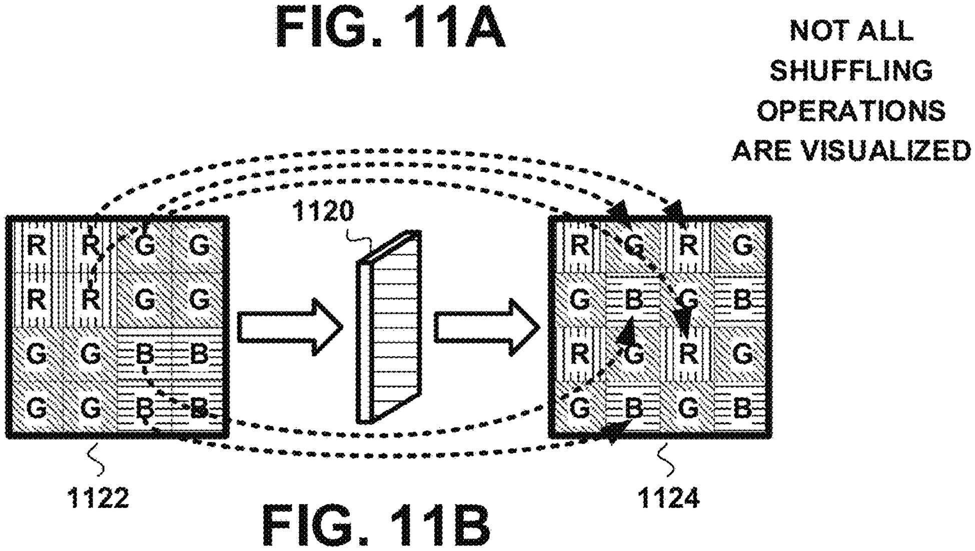
FIG. 11B illustrates an example of a Quad shuffling block of a unified demosaicing model, in accordance with various aspects of the present disclosure.
Figure 11C:
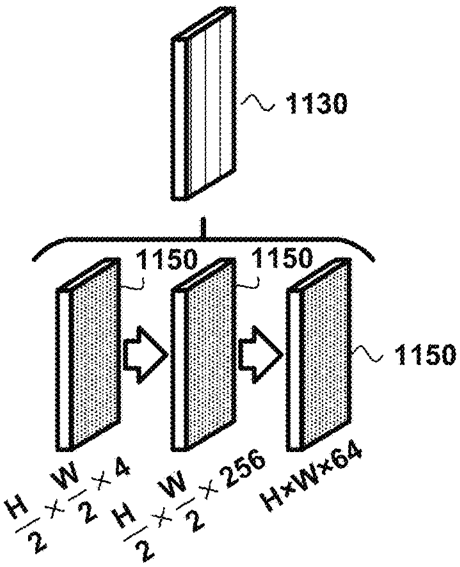
FIG. 11C depicts an example of a color extraction head of a unified demosaicing model, in accordance with various aspects of the present disclosure.
Figure 11D:
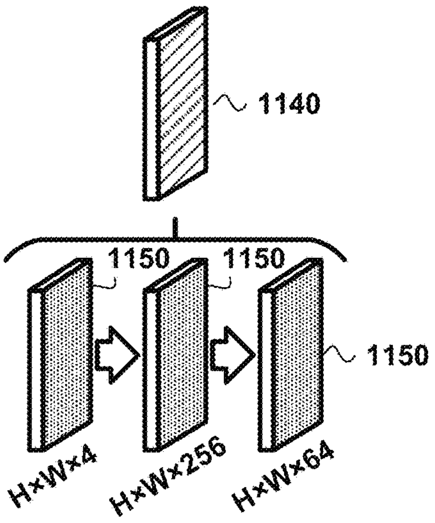
FIG. 11D illustrates an example of a modified color extraction head of a unified demosaicing model, in accordance with various aspects of the present disclosure.

FIGS. 11A to 11D depict examples of elements and/or blocks that may be used to implement the example embodiments of the unified demosaicing model 430 described with reference to FIGS. 12 to 14. In particular, FIG. 11A depicts an example of a Nona shuffling block of a unified demosaicing model, FIG. 11B illustrates an example of a Quad shuffling block of a unified demosaicing model, FIG. 11C depicts an example of a color extraction head of a unified demosaicing model, and FIG. 11D illustrates an example of a modified color extraction head of a unified demosaicing model, in accordance with various aspects of the present disclosure.

Referring to FIG. 11A, an example of a Nona shuffling block of a unified demosaicing model is depicted. As shown in FIG. 11A, the Nona shuffling block 1110 may shuffle a Nona mosaic image 1112 based on a 3×3 Nona-Bayer pattern into a Single mosaic image 1114 corresponding to a 1×1 Single-Bayer pattern. For example, the Nona shuffling block 1110 may repeatedly perform a Nona shuffling operation for each 6×6 pixel patch of the Nona mosaic image 1112 in a sliding window fashion.

Referring to FIG. 11B, an example of a Quad shuffling block of a unified demosaicing model is illustrated. As shown in FIG. 11B, the Quad shuffling block 1120 may shuffle a Quad mosaic image 1122 based on a 2×2 Quad-Bayer pattern into a Single mosaic image 1124 corresponding to a 1×1 Single-Bayer pattern. For example, the Quad shuffling block 1120 may repeatedly perform a Quad shuffling operation for each 4×4 pixel patch of the Quad mosaic image 1122 in a sliding window fashion.

Referring to FIG. 11C, an example of a color extraction head 1130 of a unified demosaicing model is depicted. As shown in FIG. 11C, the color extraction head 1130 may include three (3) convolutional layers 1150. In an embodiment, the first convolutional layer 1150 may down-sample a mosaic image having a spatial dimension and feature channel count of H×W×C to a mosaic image having a reduced spatial dimension of $$\frac{H}{2} \times \frac{W}{2} \times 4.$$

The second convolutional layer 1150 may up-sample the mosaic image to have a feature channel count of $$\frac{H}{2}\times\frac{W}{2}\times 256.$$

The third convolutional layer 1150 may down-sample the mosaic image to have a spatial dimension and feature channel count of H×W×64. However, the present disclosure is not limited in this regard, and the color extraction head 1130 may perform other convolutional operations on the mosaic image without departing from the scope of the present disclosure.

Referring to FIG. 11D, an example of a modified color extraction head 1140 of a unified demosaicing model is illustrated. As shown in FIG. 11D, the color modified extraction head 1140 may include three (3) convolutional layers 1150. In an embodiment, the first convolutional layer 1150 may down-sample a mosaic image having a spatial dimension and feature channel count of H×W×C to a mosaic image having a feature channel count of H×W×4. The second convolutional layer 1150 may up-sample the mosaic image to have a feature channel count of H×W×256. The third convolutional layer 1150 may down-sample the mosaic image to have a feature channel count of H×W×64. However, the present disclosure is not limited in this regard, and the modified color extraction head 1140 may perform other convolutional operations on the mosaic image without departing from the scope of the present disclosure.

Aspects of the present disclosure provide for a unified demosaicing model (e.g., unified demosaicing model 430) that may perform demosaicing of mosaic images captured using one or more imaging sensors 322 having a plurality of mosaic patterns 324 such as, but not limited to, a 1×1 Single-Bayer pattern 324A, a 2×2 Quad-Bayer pattern 324B, a 3×3 Nona-Bayer pattern 324C, or the like. FIGS. 12 to 14 illustrate example embodiments of the unified demosaicing model 430, in accordance with various aspects of the present disclosure.

Figure 12:
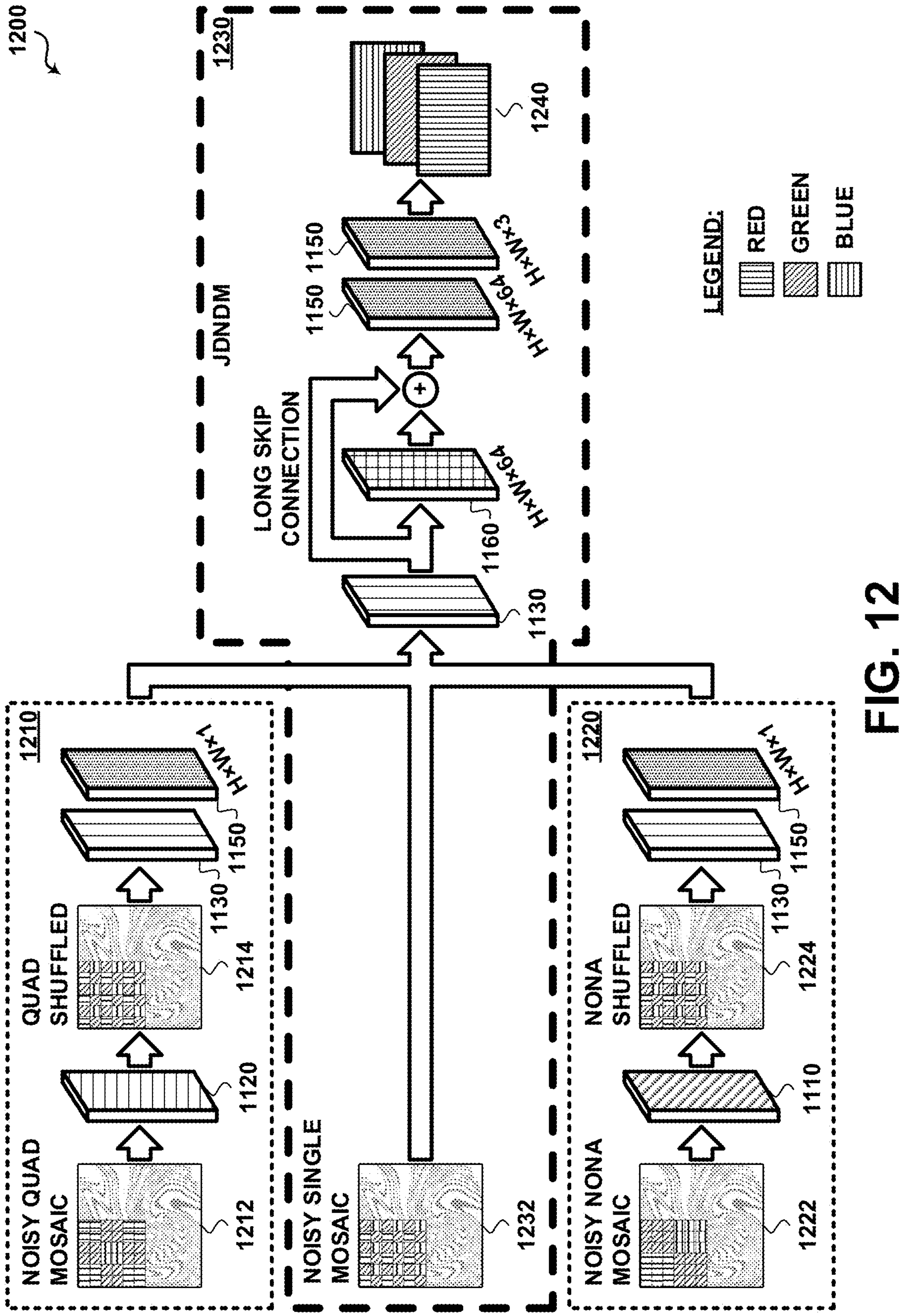
FIG. 12 depicts an example of a standard remosaic unified model (SRUM), in accordance with various aspects of the present disclosure.

FIG. 12 depicts an example of a standard remosaic unified model (SRUM), in accordance with various aspects of the present disclosure. Referring to FIG. 12, an example of a block diagram of a SRUM 1200 is depicted. The SRUM 1200 may include and/or may be similar in many respects to the unified demosaicing model 430 described above with reference to FIGS. 4 to 9, and may include additional features not mentioned above. Consequently, repeated descriptions of the SRUM 1200 described above with reference to FIGS. 4 to 9 may be omitted for the sake of brevity.

In an embodiment, at least a portion of the SRUM 1200 may be performed by the mobile device 420, which may include the demosaicing component 180. Alternatively or additionally, another computing device (e.g., device 100, a UE, a server, a laptop, a smartphone, a camera, a wearable device, a smart device, a TV, a printer, an IoT device, or the like) that may include the demosaicing component 180 may perform at least a portion of the operations performed by the SRUM 1200. That is, the mobile device 420 may perform a portion of the SRUM 1200 as described with reference to FIG. 12 and a remaining portion of the SRUM 1200 may be performed by one or more other computing devices.

As shown in FIG. 12, the SRUM 1200 may have a multi-head architecture in which each head may be configured to accept a different mosaic pattern type and a shared backbone may perform the demosaicing of the mosaic images transformed by the input heads. For example, the SRUM 1200 may include a Quad shuffle head 1210, a Nona shuffle head 1220 and a shared backbone 1230 that may accept a 1×1 Single-Bayer mosaic pattern image 1232.

The Quad shuffle head 1210 may be configured to accept a 2×2 Quad-Bayer mosaic pattern image 1212, remosaic (e.g., shuffle) the 2×2 Quad-Bayer mosaic pattern image 1212 into a Quad-shuffled Single-Bayer mosaic pattern image 1214 with the Quad shuffling block 1120, convert the Quad-shuffled Single-Bayer mosaic pattern image 1214 to have a spatial dimension and feature channel count of H×W×1 using the color extraction head 1130 and convolutional layer 1150, and provide the converted Quad-shuffled Single-Bayer mosaic pattern image to the shared backbone 1230 to perform demosaicing. Alternatively or additionally, the Quad shuffle head 1210 may be configured to provide a Quad-shuffled Single-Bayer mosaic pattern image 1214 that has been converted to have a spatial dimension and feature channel count of H/4×W/4×16, which may preserve some position information of the Quad-Bayer mosaic pattern in the resulting image.

The Nona shuffle head 1220 may be configured to accept a 3×3 Nona-Bayer mosaic pattern image 1222, remosaic (e.g., shuffle) the 3×3 Nona-Bayer mosaic pattern image 1222 into a Nona-shuffled Single-Bayer mosaic pattern image 1224 with the Nona shuffling block 1110, convert the Nona-shuffled Single-Bayer mosaic pattern image 1224 to have a spatial dimension and feature channel count of H×W×1 using the color extraction head 1130 and convolutional layer 1150, and provide the converted Nona-shuffled Single-Bayer mosaic pattern image to the shared backbone 1230 to perform demosaicing. Alternatively or additionally, the Nona shuffle head 1220 may be configured to provide a Nona-shuffled Single-Bayer mosaic pattern image 1224 that has been converted to have a spatial dimension and feature channel count of H/6×W/6×36, which may preserve some position information of the Nona-Bayer mosaic pattern in the resulting image.

The shared backbone 1230 may be configured to accept and perform joint demosaicing and denoising on a 1×1 Single-Bayer mosaic pattern image 1232 that may have been provided either directly as input to the SRUM 1200 or may have been provided by the Quad shuffle head 1210 or the Nona shuffle head 1220. In an embodiment, the shared backbone 1230 may include a convolutional neural network (CNN) such as, but not limited to, a joint denoising demosaicing (JDNDM) model, as shown in FIG. 12. The shared backbone 1230 may include a color extraction portion, a feature extraction portion, and a reconstruction portion. The color extraction portion may include a color extraction head 1130 with a relatively large filter (e.g., 256 channels) and a convolution layer to upscale the prime resolution (e.g., H×W×64). The feature extraction portion may include a residual channel attention network (RCAN) 1160 and a long skip connection (LSC). In the reconstruction portion, two (2) convolutions layer 1150 may be used to convert the extracted features into the demosaiced and denoised (clean) images 1240.

In an embodiment, the SRUM 1200 may be jointly trained with an image dataset of mosaic images (e.g., training dataset 1000) containing images for one or more targeted mosaic layouts (e.g., the 1×1 Single-Bayer pattern, the 2×2 Quad-Bayer pattern, the 3×3 Nona-Bayer pattern, or the like), as described above with reference to FIGS. 6, 8, 10A, and 10B.

As described above with reference to FIG. 12, the SRUM 1200 may be and/or may include an example of the unified demosaicing model 430 that may be based on a multi-headed approach in which mosaic images may be forced (e.g., remosaiced) into a one-channel representation.

Figure 13:
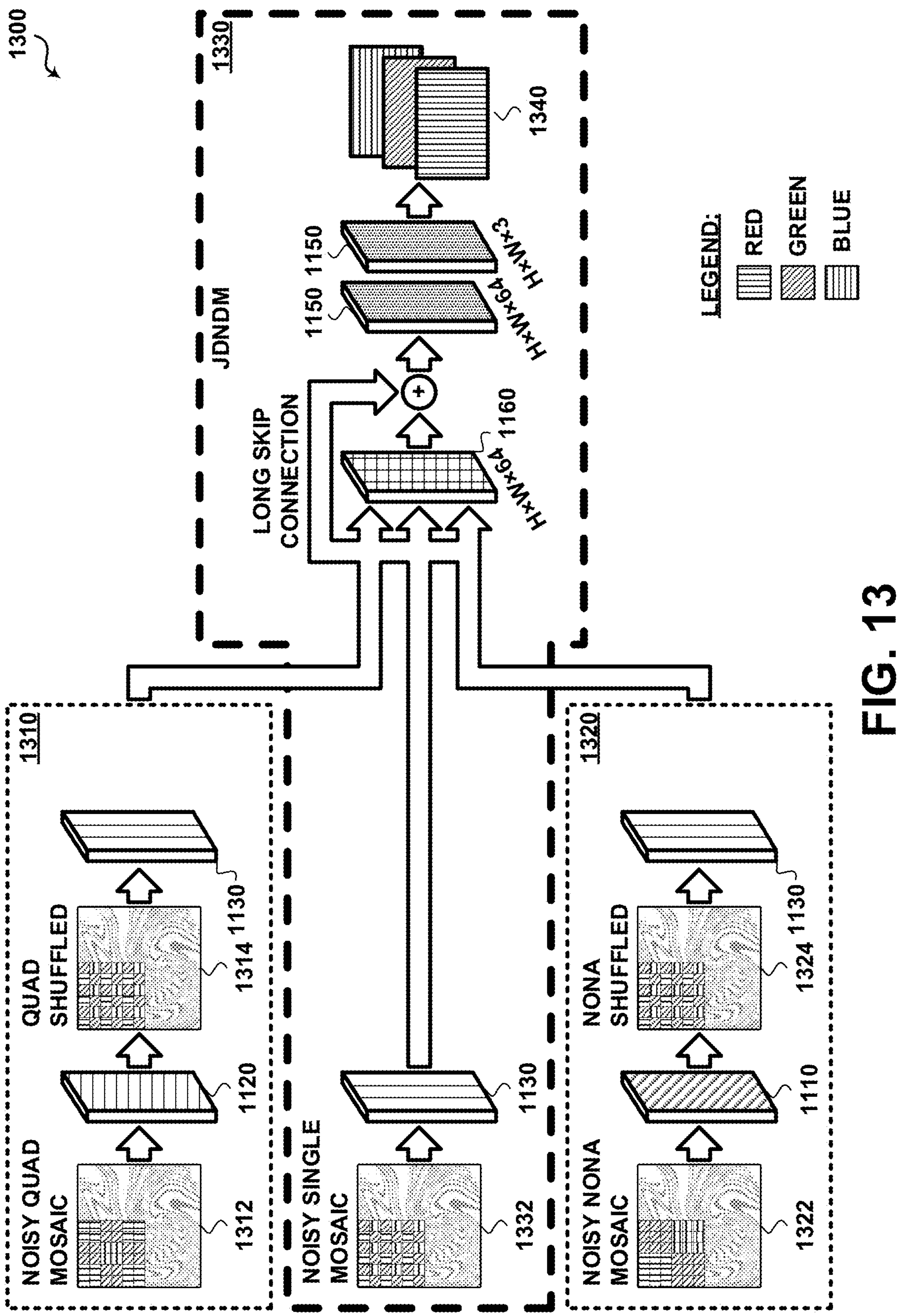
FIG. 13 illustrates an example of a latent-space unified model (LSUM), in accordance with various aspects of the present disclosure.

FIG. 13 illustrates an example of a latent-space unified model (LSUM), in accordance with various aspects of the present disclosure. Referring to FIG. 13, an example of a block diagram of a LSUM 1300 is illustrated. The LSUM 1300 may include and/or may be similar in many respects to the unified demosaicing model 430 described above with reference to FIGS. 4 to 9, and may include additional features not mentioned above. Consequently, repeated descriptions of the LSUM 1300 described above with reference to FIGS. 4 to 9 may be omitted for the sake of brevity.

In an embodiment, at least a portion of the LSUM 1300 may be performed by the mobile device 420, which may include the demosaicing component 180. Alternatively or additionally, another computing device (e.g., device 100, a UE, a server, a laptop, a smartphone, a camera, a wearable device, a smart device, a TV, a printer, an IoT device, or the like) that may include the demosaicing component 180 may perform at least a portion of the operations performed by the LSUM 1300. That is, the mobile device 420 may perform a portion of the LSUM 1300 as described with reference to FIG. 13 and a remaining portion of the LSUM 1300 may be performed by one or more other computing devices.

As shown in FIG. 13, the LSUM 1300 may have a multi-head architecture in which each head may be configured to accept a different mosaic pattern type and a shared backbone may perform the demosaicing of the mosaic images transformed by the input heads. For example, the LSUM 1300 may include a Quad shuffle head 1310, a Nona shuffle head 1320 and a shared backbone 1330 that may accept a 1×1 Single-Bayer mosaic pattern image 1332.

The LSUM 1300 may use a unified latent space that may circumvent and/or prevent an implicit bottleneck of remosaicing approaches. That is, rather than converting mosaic images into single-channel mosaic images with a spatial dimension of H×W×1, the LSUM 1300 may convert each mosaic images into a shared latent space of spatial dimension H×W×64. Consequently, the LSUM 1300 may include and/or may be similar in many respects to the SRUM 1200 described above with reference to FIG. 12, and may include additional features not mentioned above. For example, the Quad shuffle head 1310 and the Nona shuffle head 1320 of the LSUM 1300 may differ from the Quad shuffle head 1210 and the Nona shuffle head 1220 of the SRUM 1200 in that the convolution layer 1150 that forces the Quad-shuffled Single-Bayer mosaic pattern image 1214 and the Nona-shuffled Single-Bayer mosaic pattern image 1224 may not be present in the Quad shuffle head 1310 and the Nona shuffle head 1320. Alternatively or additionally, the shared latent space may be formed prior to the RCAN 1160.

The shared backbone 1330 may include and/or may be similar in many respects to the shared backbone 1230 described with reference to FIG. 12, and may include additional features not mentioned above. Consequently, repeated descriptions of the shared backbone 1330 described above with reference to FIG. 12 may be omitted for the sake of brevity.

In an embodiment, the LRUM 1300 may be jointly trained with an image dataset of mosaic images (e.g., training dataset 1000) containing images for one or more targeted mosaic layouts (e.g., the 1×1 Single-Bayer pattern, the 2×2 Quad-Bayer pattern, the 3×3 Nona-Bayer pattern, or the like), as described above with reference to FIGS. 6, 8, 10A, and 10B.

As described above with reference to FIG. 13, the LSUM 1300 may be and/or may include an example of the unified demosaicing model 430 that may be based on a multi-headed approach that may use a unified latent space, and as such, may circumvent bottlenecks that may be implicit within remosaicing approaches.

Figure 14:
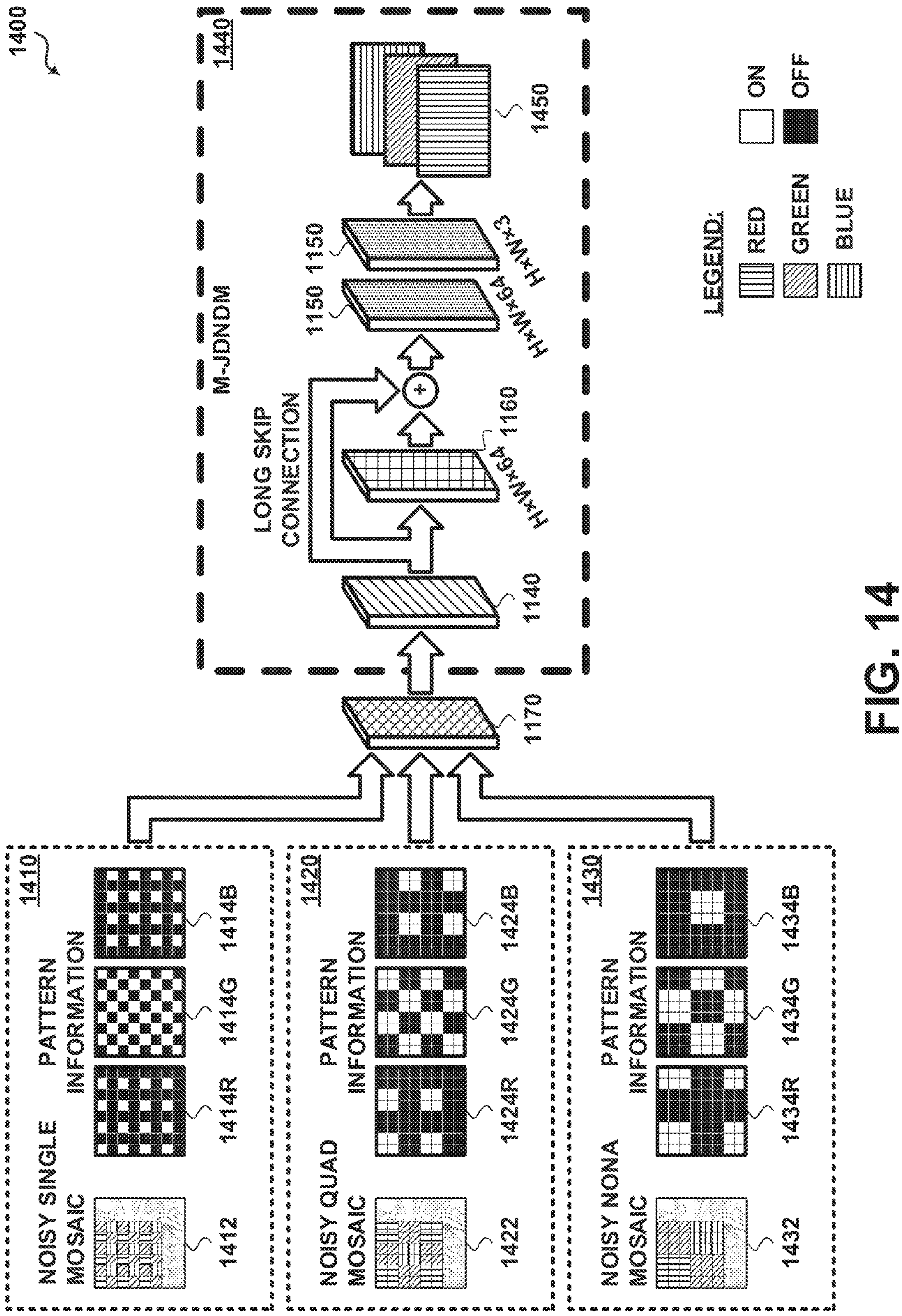
FIG. 14 depicts an example of a modified joint denoising demosaicing model (M-JDNDM), in accordance with various aspects of the present disclosure.

FIG. 14 depicts an example of a modified joint denoising demosaicing model (M-JDNDM), in accordance with various aspects of the present disclosure. Referring to FIG. 14, an example of a block diagram of an architecture 1400 including a M-JDNDM 1440 is illustrated. The M-JDNDM 1440 may include and/or may be similar in many respects to the unified demosaicing model 430 described above with reference to FIGS. 4 to 9, and may include additional features not mentioned above. Consequently, repeated descriptions of the M-JDNDM 1440 described above with reference to FIGS. 4 to 9 may be omitted for the sake of brevity.

In an embodiment, at least a portion of the architecture 1400 may be performed by the mobile device 420, which may include the demosaicing component 180. Alternatively or additionally, another computing device (e.g., device 100, a UE, a server, a laptop, a smartphone, a camera, a wearable device, a smart device, a TV, a printer, an IoT device, or the like) that may include the demosaicing component 180 may perform at least a portion of the operations performed by the architecture 1400. That is, the mobile device 420 may perform a portion of the architecture 1400 as described with reference to FIG. 14 and a remaining portion of the architecture 1400 may be performed by one or more other computing devices.

As shown in FIG. 14, the M-JDNDM 1440 may have a single-head architecture in which pattern information may be used to encode channel information. For example, the M-JDNDM 1440 may be provided, by a channel-wise stack 1170, mosaic images that may be concatenated with pattern information corresponding to the pattern of the mosaic images. That is, the channel-wise stack 1170 may be provided with a first mosaic image 1410 that may be captured using the 1×1 Single-Bayer mosaic pattern 324A, a second mosaic image 1420 that may be captured using the 2×2 Quad-Bayer mosaic pattern 324B, or a third mosaic image 1430 that may be captured using the 3×3 Nona-Bayer mosaic pattern 324C.

In an embodiment, the channel-wise stack 1170 may be provided with a noisy Single mosaic image 1412 that may be concatenated with pattern information 1414 (e.g., red pattern information 1414R, green pattern information 1414G, and blue pattern information 1414B) that may correspond to the 1×1 Single-Bayer mosaic pattern 324A. Alternatively or additionally, the channel-wise stack 1170 may be provided with a noisy Quad mosaic image 1422 that may be concatenated with pattern information 1424 (e.g., red pattern information 1424R, green pattern information 1424G, and blue pattern information 1424B) that may correspond to the 2×2 Quad-Bayer mosaic pattern 324B. As another example, the channel-wise stack 1170 may be provided with a noisy Nona mosaic image 1432 that may be concatenated with pattern information 1434 (e.g., red pattern information 1434R, green pattern information 1434G, and blue pattern information 1434B) that may correspond to the 3×3 Nona-Bayer mosaic pattern 324C.

As described above with reference to FIG. 6, the pattern information may include positional information of one or more colors of the corresponding mosaic pattern 324. For example, the pattern information may indicate the locations of each of the color filters of the corresponding mosaic pattern 324. That is, the pattern information may include one or more one-hot encoding patterns that may correspond to a sensor mosaic layout pattern of the corresponding imaging sensor 322. In an embodiment, each of the one or more one-hot encoding patterns may correspond to a location and/or position of a color of the mosaic pattern 324. For example, for any spatial location within the mosaic pattern, one of the one-hot pattern embeddings may be active (e.g., hot, high, one, "1", or the like) for one of the color filters.

The M-JDNDM 1440 may include and/or may be similar in many respects to the shared backbone 1230 described with reference to FIG. 12, and may include additional features not mentioned above. For example, the M-JDNDM 1440 may include a modified color extraction head 1140 that may not use a packing convolution, and as such, may avoid removing a natural encoding of the mosaic pattern information in the mosaic images. Consequently, repeated descriptions of the M-JDNDM 1440 described above with reference to FIG. 12 may be omitted for the sake of brevity.

In an embodiment, the M-JDNDM 1440 may be jointly trained with an image dataset of mosaic images (e.g., training dataset 1000) containing images for one or more targeted mosaic layouts (e.g., the 1×1 Single-Bayer pattern, the 2×2 Quad-Bayer pattern, the 3×3 Nona-Bayer pattern, or the like), as described above with reference to FIGS. 6, 8, 10A, and 10B.

As described above with reference to FIG. 14, the M-JDNDM 1440 may be and/or may include an embodiment of the unified demosaicing model 430 that may be based on a single-headed approach that may use pattern embedding to perform demosaicing on multiple mosaic patterns.

Figure 15A:
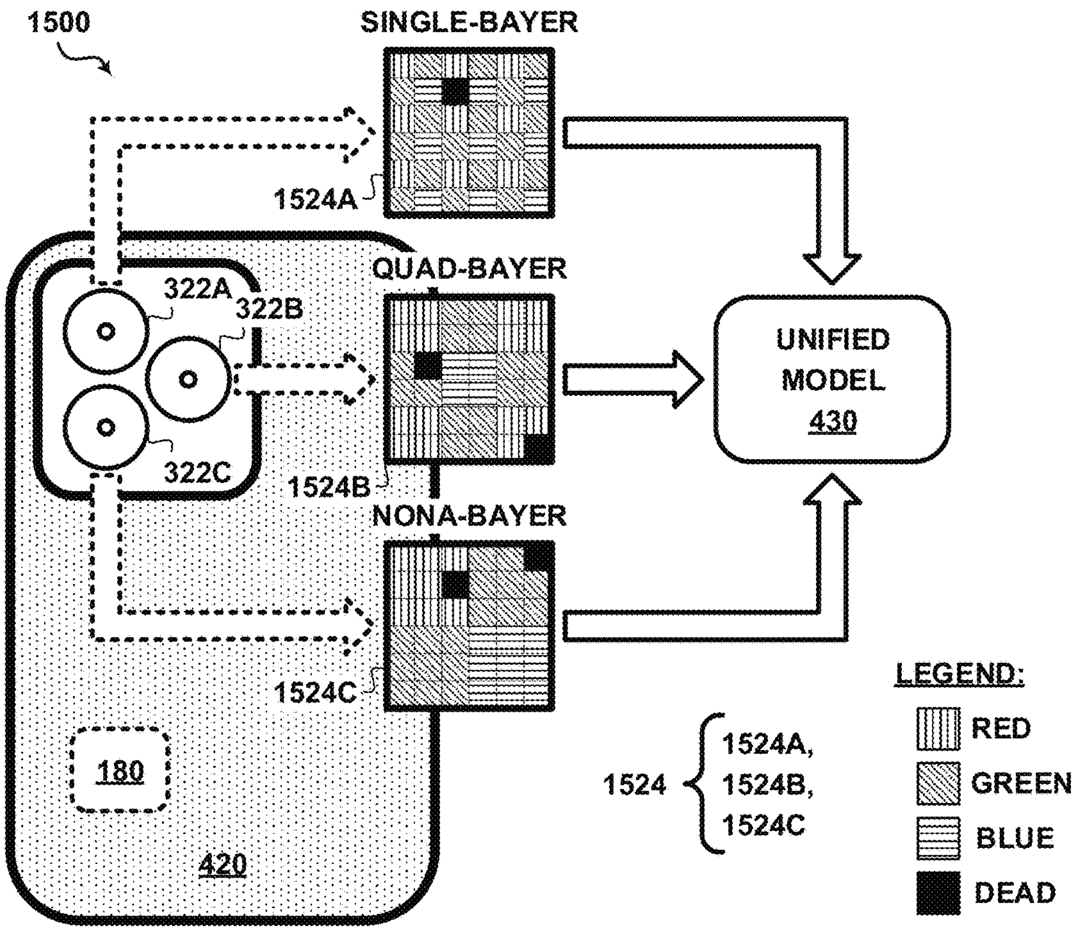
FIG. 15A illustrates an example of a mobile device with mosaic maskout, in accordance with various aspects of the present disclosure.
Figure 15B:
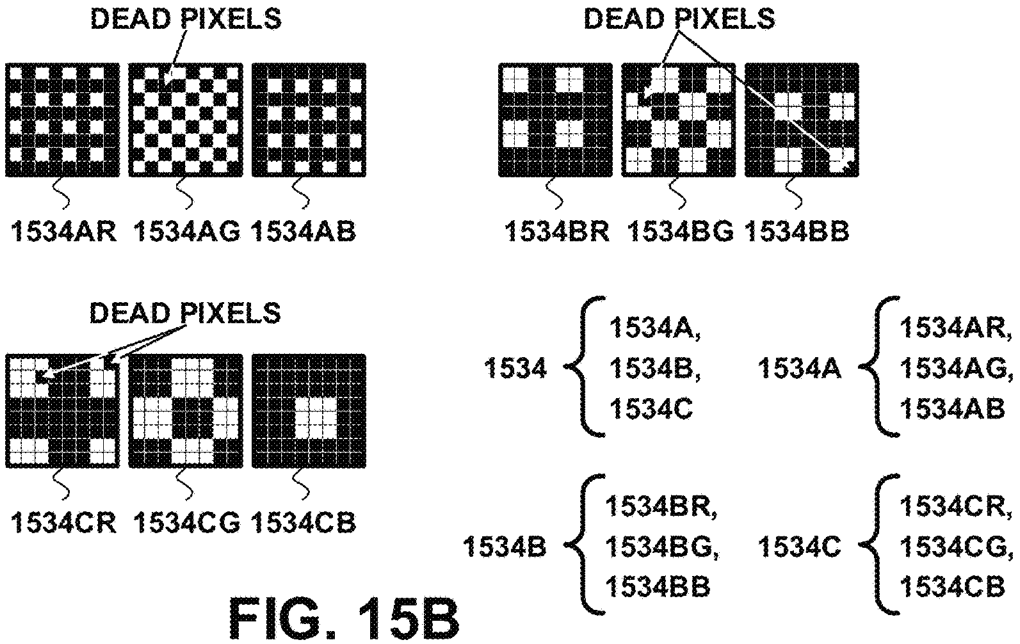
FIG. 15B depicts examples of pattern information with mosaic maskout, in accordance with various aspects of the present disclosure.

FIG. 15A illustrates an example of a mobile device with mosaic maskout 1500, in accordance with various aspects of the present disclosure. FIG. 15B depicts examples of pattern information with mosaic maskout, in accordance with various aspects of the present disclosure.

Referring to FIG. 15A, an example of a mobile device 420 is illustrated is illustrated. The mobile device 420 may include and/or may be similar in many respects to the device 100 and the mobile device 320 described above with reference to FIGS. 1 to 4, and may include additional features not mentioned above. Consequently, repeated descriptions of the mobile device 420 described above with reference to FIGS. 1 to 4 may be omitted for the sake of brevity.

As shown in FIG. 15A, the mosaic patterns 1524 (e.g., a first mosaic pattern 1524A, a second mosaic pattern 1524B, and a third mosaic pattern 1524C) may have been updated to indicate dead pixels in the corresponding imaging sensors 322 (e.g., the first imaging sensor 322A, the second imaging sensor 322B, and the third imaging sensor 322C). The dead pixels may be indicated in FIG. 15A by black squares at the pixel locations of the mosaic patterns 1524. For example, the first mosaic pattern 1524A may have one (1) dead pixel, the second mosaic pattern 1524B may have two (2) dead pixels, and the third mosaic pattern 1524C may have two (2) dead pixels. However, the present disclosure is not limited in this regard, and the imaging sensors 322 may have a different number of dead pixels (including zero (0)) and/or the dead pixels may be located in different positions in the imaging sensors 322.

Referring to FIG. 15B, pattern information 1534 with mosaic maskout is depicted. As shown in FIG. 15B, the pattern information 1534 has pixels corresponding to the dead pixels of the mosaic patterns 1524 masked out (e.g., set to a zero (0) value). For example, a first pattern information 1534A may include pattern information corresponding to the first mosaic pattern 1524A such as, for example, a first red pattern information 1534AR, a first green pattern information 1534AG, and a first blue pattern information 1534AB. In such an example, the first green pattern information 1534AG may indicate the dead pixels in the first mosaic pattern 1524A.

As another example, a second pattern information 1534B may include pattern information corresponding to the second mosaic pattern 1524B such as, for example, a second red pattern information 1534BR, a second green pattern information 1534BG, and a second blue pattern information 1534BB. In such an example, the second green pattern information 1534BG and the second blue pattern information 1534BB may indicate the dead pixels in the second mosaic pattern 1524B.

As another example, a third pattern information 1534C may include pattern information corresponding to the third mosaic pattern 1524C such as, for example, a third red pattern information 1534CR, a third green pattern information 1534CG, and a third blue pattern information 1534CB. In such an example, the third red pattern information 1534CR may indicate the dead pixels in the third mosaic pattern 1524C.

In an embodiment, the updated pattern information 1534 may be concatenated to mosaic images generated by the imaging sensors 322 and provided to the unified demosaicing model 430. In such a manner, the unified demosaicing model 430 may produce demosaiced and denoised (clean) images 1450 that have been corrected for the dead pixels in the imaging sensors 322, as described above with reference to FIGS. 9 and 14.

Advantageously, the methods, apparatuses, systems, and non-transitory computer-readable mediums for demosaicing and denoising images, described above with reference to FIGS. 1 to 15B, provide a unified demosaicing model capable of demosaicing and/or denoising mosaic images that may have been captured using multiple sensor mosaic layouts without a need to switch between different models that may be configured to a specific mosaic layout. Furthermore, aspects presented herein provide for correcting errors in the mosaic images that may be caused by dead pixels in the imaging sensors. The aspects described herein may also be applicable to other image processing technologies and the image processing standards that employ these technologies.

Figure 16:
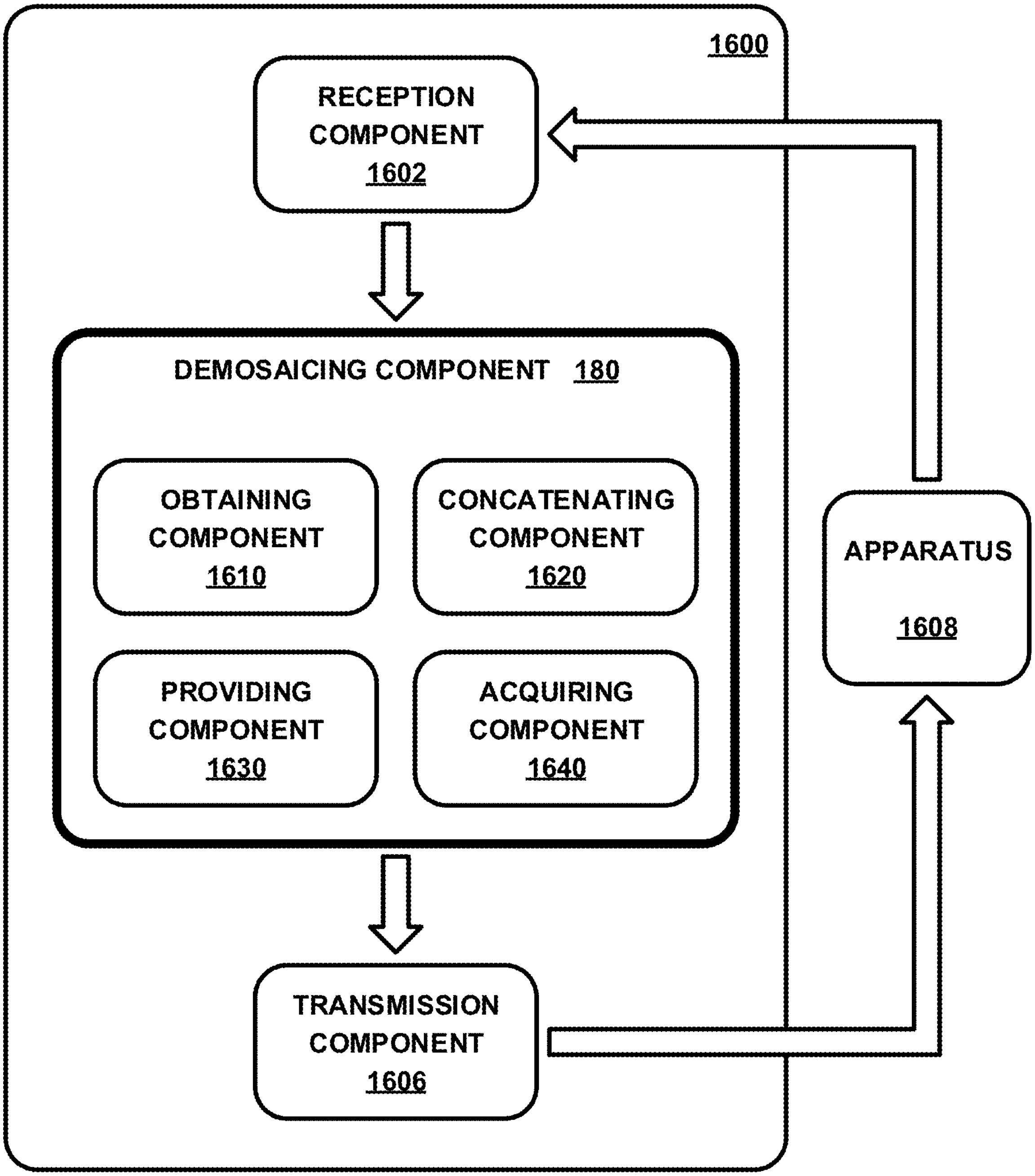
FIG. 16 illustrates a block diagram of an example apparatus for demosaicing images, in accordance with various aspects of the present disclosure.

FIG. 16 illustrates a block diagram of an example apparatus for demosaicing images, in accordance with various aspects of the present disclosure. The apparatus 1600 may be a computing device (e.g., device 100 of FIG. 1) and/or a computing device may include the apparatus 1600. In some embodiments, the apparatus 1600 may include a reception component 1602 configured to receive communications (e.g., wired, wireless) from another apparatus (e.g., apparatus 1608), a demosaicing component 180 configured to demosaic images, and a transmission component 1606 configured to transmit communications (e.g., wired, wireless) to another apparatus (e.g., apparatus 1608). The components of the apparatus 1600 may be in communication with one another (e.g., via one or more buses or electrical connections). As shown in FIG. 16, the apparatus 1600 may be in communication with another apparatus 1608 (such as, but not limited to, a server, a laptop, a smartphone, a UE, a camera, a wearable device, a smart device, an IoT device, or the like) using the reception component 1602 and/or the transmission component 1606.

In some embodiments, the apparatus 1600 may be configured to perform one or more operations described herein in connection with FIGS. 1 to 15B. Alternatively or additionally, the apparatus 1600 may be configured to perform one or more processes described herein, such as method 1700 of FIG. 17. In some embodiments, the apparatus 1600 may include one or more components of the device 100 described with reference to FIG. 1.

The reception component 1602 may receive communications, such as control information, data communications, or a combination thereof, from the apparatus 1608 (e.g., a server, a laptop, a smartphone, a UE, a camera, a wearable device, a smart device, an IoT device, or the like). The reception component 1602 may provide received communications to one or more other components of the apparatus 1600, such as the demosaicing component 180. In some embodiments, the reception component 1602 may perform signal processing on the received communications, and may provide the processed signals to the one or more other components. In some embodiments, the reception component 1602 may include one or more antennas, a receive processor, a controller/processor, a memory, or a combination thereof, of the device 100 described with reference to FIG. 1.

The transmission component 1606 may transmit communications, such as control information, data communications, or a combination thereof, to the apparatus 1608 (e.g., a server, a laptop, a smartphone, a UE, a camera, a wearable device, a smart device, an IoT device, or the like). In some embodiments, the demosaicing component 180 may generate communications and may transmit the generated communications to the transmission component 1606 for transmission to the apparatus 1608. In some embodiments, the transmission component 1606 may perform signal processing on the generated communications, and may transmit the processed signals to the apparatus 1608. In other embodiments, the transmission component 1606 may include one or more antennas, a transmit processor, a controller/processor, a memory, or a combination thereof, of the device 100 described with reference to FIG. 1. In some embodiments, the transmission component 1606 may be co-located with the reception component 1602 such as in a transceiver and/or a transceiver component.

The demosaicing component 180 may be configured to demosaic and/or denoise mosaic images that may have been captured using multiple sensor mosaic layouts without a need to switch between different models. In some embodiments, the demosaicing component 180 may include a set of components, such as an obtaining component 1610 configured to obtain a plurality of mosaic images, a concatenating component 1620 configured to concatenate encoded embeddings to the plurality of mosaic images, a providing component 1630 configured to provide the concatenated plurality of mosaic images to a machine learning model, and an acquiring component 1640 configured to acquire a plurality of demosaiced images corresponding to the plurality of mosaic images.

In some embodiments, the set of components may be separate and distinct from the demosaicing component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIGS. 1 to 15B.

Figure 17:
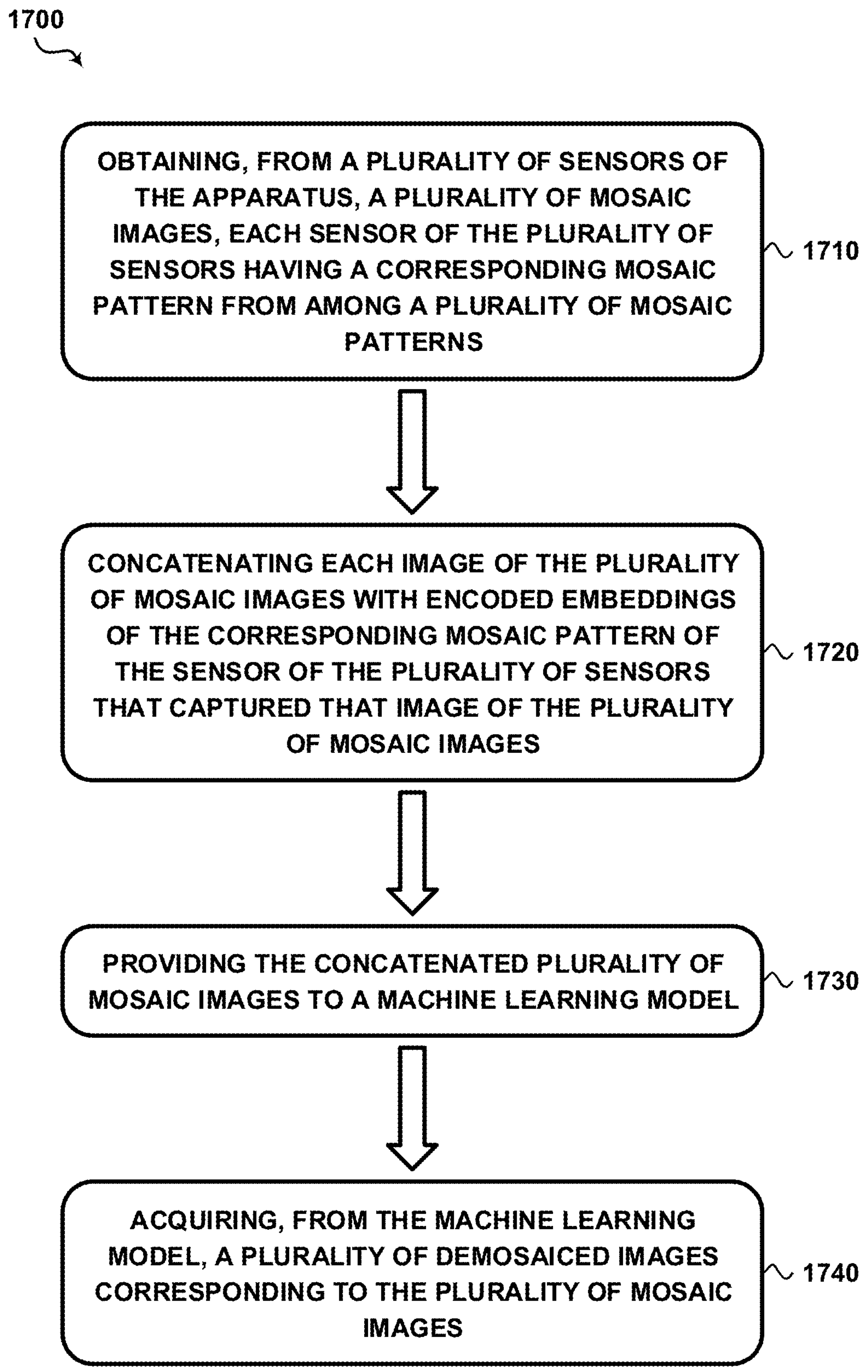
FIG. 17 depicts a flowchart of an example method for demosaicing images, in accordance with various aspects of the present disclosure.

Referring to FIG. 17, in operation, an apparatus 1600 may perform a method 1700 of demosaicing images. The method 1700 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the demosaicing component 180) and/or the apparatus 1600. The method 1700 may be performed by the device 100, the apparatus 1600, and/or the demosaicing component 180 in communication with the apparatus 1608 (e.g., a server, a laptop, a smartphone, a UE, a camera, a wearable device, a smart device, an IoT device, or the like).

At block 1710 of FIG. 17, the method 1700 may include obtaining, from a plurality of sensors of the apparatus, a plurality of mosaic images, each sensor of the plurality of sensors having a corresponding mosaic pattern from among a plurality of mosaic patterns. For example, in an aspect, the device 100, the demosaicing component 180, and/or the obtaining component 1610 may be configured to or may include means for obtaining, from a plurality of sensors 322 of the apparatus 1600, a plurality of mosaic images, each sensor of the plurality of sensors 322 having a corresponding mosaic pattern from among a plurality of mosaic patterns 324.

In an embodiment, the obtaining at block 1710 may include obtaining a plurality of mosaic images that may have been generated from at least one of the 1×1 Single-Bayer pattern 324A, the 2×2 Quad-Bayer pattern 324B, the 3×3 Nona-Bayer pattern 324C, or the Q×Q Bayer pattern, as described above with reference to FIG. 7.

In an optional or additional embodiment, the obtaining at block 1710 may include obtaining a plurality of mosaic images that may include one or more mosaic images with noise.

In an optional or additional embodiment, at least one sensor of the plurality of sensors 322 may include one or more dead pixels in a CFA of the at least one sensor 322.

At block 1720 of FIG. 17, the method 1700 may include concatenating each image of the plurality of mosaic images with encoded embeddings of the corresponding mosaic pattern of the sensor of the plurality of sensors that captured that image of the plurality of mosaic images. For example, in an aspect, the device 100, the demosaicing component 180, and/or the concatenating component 1620 may be configured to or may include means for concatenating each image of the plurality of mosaic images with encoded embeddings of the corresponding mosaic pattern 324 of the sensor of the plurality of sensors 322 that captured that image of the plurality of mosaic images.

For example, each of the encoded embeddings may indicate the corresponding mosaic pattern of a color filter array of a corresponding sensor of the plurality of sensors.

In an optional or additional embodiment, each of the encoded embeddings may include positional information of one or more colors of the corresponding mosaic pattern 324.

In an optional or additional embodiment, each of the encoded embeddings may include one or more one-hot encoding patterns corresponding to a sensor pattern of a corresponding sensor of the plurality of sensors 322.

In an optional or additional embodiment, each of the one or more one-hot encoding patterns may correspond to a color of the sensor pattern of the corresponding sensor 322.

In an optional or additional embodiment, the encoded embeddings may indicate one or more dead pixels of a corresponding sensor 322.

At block 1730 of FIG. 17, the method 1700 may include providing the concatenated plurality of mosaic images to a machine learning model. For example, in an aspect, the device 100, the demosaicing component 180, and/or the providing component 1630 may be configured to or may include means for providing the concatenated plurality of mosaic images to a machine learning model 430.

For example, the providing at block 1730 may include providing to the unified demosaicing model 430 a plurality of channels including the plurality of mosaic images and the encoded embeddings.

At block 1740 of FIG. 17, the method 1700 may include acquiring, from the machine learning model, a plurality of demosaiced images corresponding to the plurality of mosaic images. For example, in an aspect, the device 100, the demosaicing component 180, and/or the acquiring component 1640 may be configured to or may include means for acquiring, from the machine learning model 430, a plurality of demosaiced images 1450 corresponding to the plurality of mosaic images.

For example, the acquiring at block 1740 may include acquiring, from the machine learning model 430, one or more demosaiced images 1450 corresponding to the one or more mosaic images having the noise removed.

In an optional or additional aspect that may be combined with any other aspects, the method 1700 may further include training the machine learning model 430 based on a first portion of an image dataset 1000 and the encoded embeddings of the plurality of mosaic patterns 324, validating the machine learning model 430 using a second portion of the image dataset 1000 and the encoded embeddings of the plurality of mosaic patterns 324, and testing the machine learning model 430 using a third portion of the image dataset 1000 and the encoded embeddings of the plurality of mosaic patterns 324. The second portion of the image dataset 1000 may be different from the first portion of the image dataset 1000. The third portion of the image dataset 1000 may be different from the first portion and the second portion of the image dataset 1000.

The image dataset 1000 may include a plurality of scenes 1020 captured at a plurality of views 1060A to 1060N. Each view of the plurality of views may have been captured at a plurality of focuses. Each scene 1020 may include at least one high-frequency region including at least one of a plurality of textures or a plurality of objects that may have a size less than a predetermined threshold.

In an optional or additional aspect that may be combined with any other aspects, the method 1700 may further include determining a random percentage value between zero and a predetermined mask limit, calculating, based on the random percentage value, a random amount of pixels to mask out in the encoded embeddings for each training iteration of the machine learning model, and randomly selecting the random amount of pixels of the encoded embeddings to be masked out.

The following aspects are illustrative only and aspects thereof may be combined with aspects of other embodiments or teaching described herein, without limitation.

Aspect 1 is method for demosaicing images by an apparatus. The method includes obtaining, from a plurality of sensors of the apparatus, a plurality of mosaic images, concatenating each image of the plurality of mosaic images with encoded embeddings of the corresponding mosaic pattern of the sensor of the plurality of sensors that captured that image of the plurality of mosaic images, providing the concatenated plurality of mosaic images to a machine learning model, and acquiring, from the machine learning model, a plurality of demosaiced images corresponding to the plurality of mosaic images. Each sensor of the plurality of sensors having a corresponding mosaic pattern from among a plurality of mosaic patterns.

In Aspect 2, the plurality of mosaic patterns of Aspect 1 includes at least one of a Single-Bayer pattern, a Quad-Bayer pattern, a Nona-Bayer pattern, or a Q×Q Bayer pattern. Q is a positive integer greater than three (3).

In Aspect 3, each of the encoded embeddings of any of Aspects 1 or 2 indicate the corresponding mosaic pattern of a color filter array of a corresponding sensor of the plurality of sensors.

In Aspect 4, each of the encoded embeddings of any of Aspects 1 to 3 includes positional information of one or more colors of the corresponding mosaic pattern.

In Aspect 5, each of the encoded embeddings of any of Aspects 1 to 4 includes one or more one-hot encoding patterns corresponding to a sensor pattern of a corresponding sensor of the plurality of sensors.

In Aspect 6, each of the one or more one-hot encoding patterns of Aspect 5 corresponds to a color of the sensor pattern of the corresponding sensor.

In Aspect 7, at least one sensor of the plurality of sensors of any of Aspects 1 to 6 includes one or more dead pixels in a color filter array of the at least one sensor, and the encoded embeddings corresponding to the at least one sensor indicate the one or more dead pixels. The acquiring of the plurality of demosaiced images includes acquiring, from the machine learning model, one or more demosaiced images corresponding to the at least one sensor having the one or more dead pixels corrected.

In Aspect 8, the plurality of mosaic images of any of Aspects 1 to 7 includes one or more mosaic images with noise. The acquiring of the plurality of demosaiced images includes acquiring, from the machine learning model, one or more demosaiced images corresponding to the one or more mosaic images having the noise removed.

In Aspect 9, the method of any of Aspects 1 to 8 includes training the machine learning model based on a first portion of an image dataset and the encoded embeddings of the plurality of mosaic patterns, validating the machine learning model using a second portion of the image dataset and the encoded embeddings of the plurality of mosaic patterns, and testing the machine learning model using a third portion of the image dataset and the encoded embeddings of the plurality of mosaic patterns. The image dataset includes a plurality of scenes captured at a plurality of views. Each view of the plurality of views is captured at a plurality of focuses. Each scene includes at least one high-frequency region that includes at least one of a plurality of textures or a plurality of objects having a size less than a predetermined threshold. The second portion is different from the first portion, and the third portion is different from the first portion and the second portion.

In Aspect 10, the training of the machine learning model of Aspect 9 includes determining a random amount of pixels to mask out in the encoded embeddings for each training iteration of the machine learning model, and randomly selecting the random amount of pixels of the encoded embeddings to be masked out.

In Aspect 11, the determining of the random amount of pixels of Aspect 10 includes determining a random percentage value between zero and a predetermined mask limit, and calculating the random amount of pixels to mask out based on the random percentage value.

Aspect 12 is an apparatus for demosaicing images. The apparatus includes a plurality of sensors, a memory storing instructions, and one or more processors communicatively coupled with the plurality of sensors and the memory. Each sensor of the plurality of sensors has a corresponding mosaic pattern from among a plurality of mosaic patterns. The one or more processors are configured to execute the instructions to perform one or more of the methods of any of Aspects 1 to 11.

Aspect 13 is an apparatus for demosaicing images. The apparatus includes means for performing one or more of the methods of any of Aspects 1 to 11.

Aspect 14 is a non-transitory computer-readable storage medium storing computer-executable instructions for demosaicing images by an apparatus. The computer-executable instructions are configured, when executed by one or more processors of the apparatus, to cause the apparatus to perform one or more of the methods of any of Aspects 1 to 11.

The foregoing disclosure provides illustration and description, but may not be intended to be exhaustive or to limit the implementations to the precise form disclosed. Modifications and variations are possible in light of the above disclosure or may be acquired from practice of the implementations.

For example, the terms "component," "module," "system" or the like are intended to include a computer-related entity, such as but not limited to hardware, firmware, a combination of hardware and software, software, or software in execution. For example, a component may be, but may not be limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium may be a tangible device that may retain and store instructions for use by an instruction execution device. The computer readable storage medium may be, for example, but may not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, for example, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local-area network (LAN) or a wide-area network (WAN), or the connection may be made to an external computer (for example, through the Internet using an internet service provider). In some embodiments, electronic circuitry including, for example, programmable logic circuitry, field programmable gate arrays (FPGA), and/or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, or the like, that may execute the respective functions through controls of one or more microprocessors or other control apparatuses. Also, at least one of these components may be specifically embodied by a module, a program, or a part of code, which may contain one or more executable instructions for performing specified logic functions, and may be executed by one or more microprocessors or other control apparatuses. Further, at least one of these components may include or may be implemented by a processor such as a central processing unit (CPU) that may perform the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing or the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical functions. The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It may be apparent that systems and/or methods, described herein, may be implemented in different forms of hardware, firmware, or a combination of hardware and software. The actual specialized control hardware or software code used to implement these systems and/or methods may not be limiting of the implementations. Thus, the operation and behavior of the systems and/or methods were described herein without reference to specific software code—it being understood that software and hardware may be designed to implement the systems and/or methods based on the description herein.

No element, act, or instruction described in the present disclosure should be construed as critical or essential unless explicitly described as such. Also, for example, the articles "a" and "an" may be intended to include one or more items, and may be used interchangeably with "one or more." Furthermore, for example, the term "set" may be intended to include one or more items (e.g., related items, unrelated items, a combination of related and unrelated items, or the like), and may be used interchangeably with "one or more." Where only one item may be intended, the term "one" or similar language may be used. Also, for example, the terms "has," "have," "having," "includes," "including," or the like may be intended to be open-ended terms. Further, the phrase "based on" may be intended to mean "based, at least in part, on" unless explicitly stated otherwise. In addition, expressions such as "at least one of [A] and [B]" or "at least one of [A] or [B]" may be understood to include only A, only B, or both A and B.

Reference throughout this specification to "one embodiment," "an embodiment," or similar language may indicate that a particular feature, structure, or characteristic described in connection with the indicated embodiment may be included in at least one embodiment of the present solution. Thus, the phrases "in one embodiment", "in an embodiment," and similar language throughout this specification may, but do not necessarily, all refer to the same embodiment. For example, such terms as "1st" and "2nd," or "first" and "second" may be used to simply distinguish a corresponding component from another, and does not limit the components in other aspects (e.g., importance or order). It may be understood that if an element (e.g., a first element) may be referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It may be understood that when an element or layer may be referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element may be referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein may be chosen to best explain the principles of the embodiments, the practical application or technical improvement over technologies found in the marketplace, or to enable others of ordinary skill in the art to understand the embodiments disclosed herein.

It may be understood that the specific order or hierarchy of blocks in the processes/flowcharts disclosed are an illustration of exemplary approaches. Based upon design preferences, it may be understood that the specific order or hierarchy of blocks in the processes/flowcharts may be rearranged. Further, some blocks may be combined and/or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

What is claimed is:

1. A method for demosaicing images by an apparatus, the method comprising:

obtaining, from a plurality of sensors of the apparatus, a plurality of mosaic images, each sensor of the plurality of sensors having a corresponding mosaic pattern from among a plurality of mosaic patterns;

generating a concatenated plurality of mosaic images by concatenating each image of the plurality of mosaic images with encoded embeddings of the corresponding mosaic pattern of the sensor of the plurality of sensors that captured that image of the plurality of mosaic images;

providing the concatenated plurality of mosaic images to a machine learning model; and acquiring, from the machine learning model, a plurality of demosaiced images corresponding to the plurality of mosaic images, wherein at least one sensor of the plurality of sensors comprises one or more dead pixels in a color filter array of the at least one sensor, wherein the encoded embeddings corresponding to the at least one sensor indicate the one or more dead pixels, and wherein the acquiring of the plurality of demosaiced images comprises acquiring, from the machine learning model, one or more demosaiced images corresponding to the at least one sensor having the one or more dead pixels corrected.

2. The method of claim 1, wherein the plurality of mosaic patterns comprises at least one of a Single-Bayer pattern, a Quad-Bayer pattern, a Nona-Bayer pattern, or a Q×Q Bayer pattern, and wherein Q is a positive integer greater than three (3).

3. The method of claim 1, wherein each of the encoded embeddings indicates the corresponding mosaic pattern of a color filter array of a corresponding sensor of the plurality of sensors.

4. The method of claim 1, wherein each of the encoded embeddings comprises positional information of one or more colors of the corresponding mosaic pattern.

5. The method of claim 1, wherein each of the encoded embeddings comprises one or more one-hot encoding patterns corresponding to a sensor pattern of a corresponding sensor of the plurality of sensors.

6. The method of claim 5, wherein each of the one or more one-hot encoding patterns corresponds to a color of the sensor pattern of the corresponding sensor.

7. The method of claim 1, wherein the plurality of mosaic images comprises one or more mosaic images with noise, and wherein the acquiring of the plurality of demosaiced images comprises acquiring, from the machine learning model, one or more demosaiced images corresponding to the one or more mosaic images having the noise removed.

8. The method of claim 1, further comprising:

training the machine learning model based on a first portion of an image dataset and the encoded embeddings of the plurality of mosaic patterns, the image dataset comprising a plurality of scenes captured at a plurality of views, each view of the plurality of views being captured at a plurality of focuses, each scene comprising at least one high-frequency region comprising at least one of a plurality of textures or a plurality of objects having a size less than a predetermined threshold;

validating the machine learning model using a second portion of the image dataset and the encoded embeddings of the plurality of mosaic patterns, the second portion being different from the first portion; and testing the machine learning model using a third portion of the image dataset and the encoded embeddings of the plurality of mosaic patterns, the third portion being different from the first portion and the second portion.

9. The method of claim 8, wherein the training of the machine learning model comprises:

determining a random amount of pixels to mask out in the encoded embeddings for each training iteration of the machine learning model; and randomly selecting the random amount of pixels of the encoded embeddings to be masked out.

10. The method of claim 9, wherein the determining of the random amount of pixels comprises:

determining a random percentage value between zero and a predetermined mask limit; and calculating the random amount of pixels to mask based on the random percentage value.

11. An apparatus for demosaicing images, comprising:

a plurality of sensors, each sensor of the plurality of sensors having a corresponding mosaic pattern from among a plurality of mosaic patterns;

a memory storing instructions; and one or more processors communicatively coupled with the plurality of sensors and the memory, wherein the one or more processors are configured to execute the instructions to:

obtain, from the plurality of sensors, a plurality of mosaic images;

generate concatenated plurality of mosaic images by concatenating each image of the plurality of mosaic images with encoded embeddings of the corresponding mosaic pattern of the sensor of the plurality of sensors that captured that image of the plurality of mosaic images;

provide the concatenated plurality of mosaic images to a machine learning model; and acquire, from the machine learning model, a plurality of demosaiced images corresponding to the plurality of mosaic images, wherein at least one sensor of the plurality of sensors comprises one or more dead pixels in a color filter array of the at least one sensor, wherein the encoded embeddings corresponding to the at least one sensor indicate the one or more dead pixels, and wherein the one or more processors are further configured to execute the instructions to acquire, from the machine learning model, one or more demosaiced images corresponding to the at least one sensor having the one or more dead pixels corrected.

12. The apparatus of claim 11, wherein the plurality of mosaic patterns comprises at least one of a Single-Bayer pattern, a Quad-Bayer pattern, a Nona-Bayer pattern, or a Q×Q Bayer pattern, and wherein Q is a positive integer greater than three (3).

13. The apparatus of claim 11, wherein each of the encoded embeddings indicates the corresponding mosaic pattern of a color filter array of a corresponding sensor of the plurality of sensors.

14. The apparatus of claim 11, wherein each of the encoded embeddings comprises positional information of one or more colors of the corresponding mosaic pattern.

15. The apparatus of claim 11, wherein the plurality of mosaic images comprises one or more mosaic images with noise, and wherein the one or more processors are further configured to execute the instructions to acquire, from the machine learning model, one or more demosaiced images corresponding to the one or more mosaic images having the noise removed.

16. The apparatus of claim 11, wherein the one or more processors are further configured to execute the instructions to:

train the machine learning model based on a first portion of an image dataset and the encoded embeddings of the plurality of mosaic patterns, the image dataset comprising a plurality of scenes captured at a plurality of views, each view of the plurality of views being captured at a plurality of focuses, each scene comprising at least one high-frequency region comprising at least one of a plurality of textures or a plurality of objects having a size less than a predetermined threshold;

validate the machine learning model using a second portion of the image dataset and the encoded embeddings of the plurality of mosaic patterns, the second portion being different from the first portion; and test the machine learning model using a third portion of the image dataset and the encoded embeddings of the plurality of mosaic patterns, the third portion being different from the first portion and the second portion.

17. The apparatus of claim 16, wherein the one or more processors are further configured to execute the instructions to:

determine a random percentage value between zero and a predetermined mask limit;

calculate, based on the random percentage value, a random amount of pixels to mask out in the encoded embeddings for each training iteration of the machine learning model; and randomly select the random amount of pixels of the encoded embeddings to be masked out.

18. A non-transitory computer-readable storage medium storing computer-executable instructions for demosaicing images that, when executed by at least one processor of an apparatus, cause the apparatus to:

obtain, from a plurality of sensors of the apparatus, a plurality of mosaic images, each sensor of the plurality of sensors having a corresponding mosaic pattern from among a plurality of mosaic patterns;

generate concatenated plurality of mosaic images by concatenating each image of the plurality of mosaic images with encoded embeddings of the corresponding mosaic pattern of the sensor of the plurality of sensors that captured that image of the plurality of mosaic images;

provide the concatenated plurality of mosaic images to a machine learning model; and acquire, from the machine learning model, a plurality of demosaiced images corresponding to the plurality of mosaic images, wherein at least one sensor of the plurality of sensors comprises one or more dead pixels in a color filter array of the at least one sensor, wherein the encoded embeddings corresponding to the at least one sensor indicate the one or more dead pixels, and wherein the acquiring of the plurality of demosaiced images comprises acquiring, from the machine learning model, one or more demosaiced images corresponding to the at least one sensor having the one or more dead pixels corrected.

* * * * *